(12) United States Patent
Zhang et al.

(10) Patent No.: US 8,300,948 B2
(45) Date of Patent: Oct. 30, 2012

(54) DE-RINGING OPERATION FOR IMAGE PROCESSING

(75) Inventors: Bo Zhang, Westford, MA (US); Ashish Koul, Cambridge, MA (US); Olivier Francois Joseph Harel, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 905 days.

(21) Appl. No.: 12/400,596

(22) Filed: Mar. 9, 2009

(65) Prior Publication Data

US 2010/0135592 A1 Jun. 3, 2010

Related U.S. Application Data

(60) Provisional application No. 61/118,557, filed on Nov. 28, 2008.

(51) Int. Cl.
*G06K 9/48* (2006.01)
*G06K 9/40* (2006.01)

(52) U.S. Cl. ......... 382/199; 382/254; 382/260; 382/275

(58) Field of Classification Search .................. 382/199, 382/254, 260, 275
See application file for complete search history.

(56) References Cited

U.S. PATENT DOCUMENTS

| | | | |
|---|---|---|---|
| 7,330,565 B1* | 2/2008 | Der | 382/103 |
| 7,379,626 B2* | 5/2008 | Lachine et al. | 382/300 |
| 2010/0002953 A1* | 1/2010 | Kirenko et al. | 382/268 |

OTHER PUBLICATIONS

Luo, Fast Wavelet Image Denoising Based on Local Variance and Edge Analysis, 2006, International Journal of Electrical and Computer Engineering, pp. 457-467.*
Jha et al., Edge Adaptive Filtering: How much and in what direction?, 1989, IEE, pp. 364-366.*

* cited by examiner

*Primary Examiner* — John Strege
(74) *Attorney, Agent, or Firm* — Garlick & Markison; Shayne X. Short

(57) ABSTRACT

De-ringing operation for image processing. A selective image processing means is presented herein by which high frequency content is preserved while also eliminating ringing within digital images, and this is achieved without introducing aliasing. Based on the analysis of neighboring pixels, one or more of multiple filter modules and/or multiple image filtering/rocessing means is/are selectively applied to generate an output sample for a given pixel location. Two measures (e.g., local activity (LA) and edge strength (ES)) are calculated based on processing at least two different groups of pixels near a desired output sample. One of these groups of pixels may be a subset of another of the groups of pixels. By analyzing these two measures (e.g., LA and ES), selective processing of pixels near the desired output location ensures that high frequency content within the digital image is preserved with substantially reduced and/or eliminated ringing therein.

20 Claims, 17 Drawing Sheets

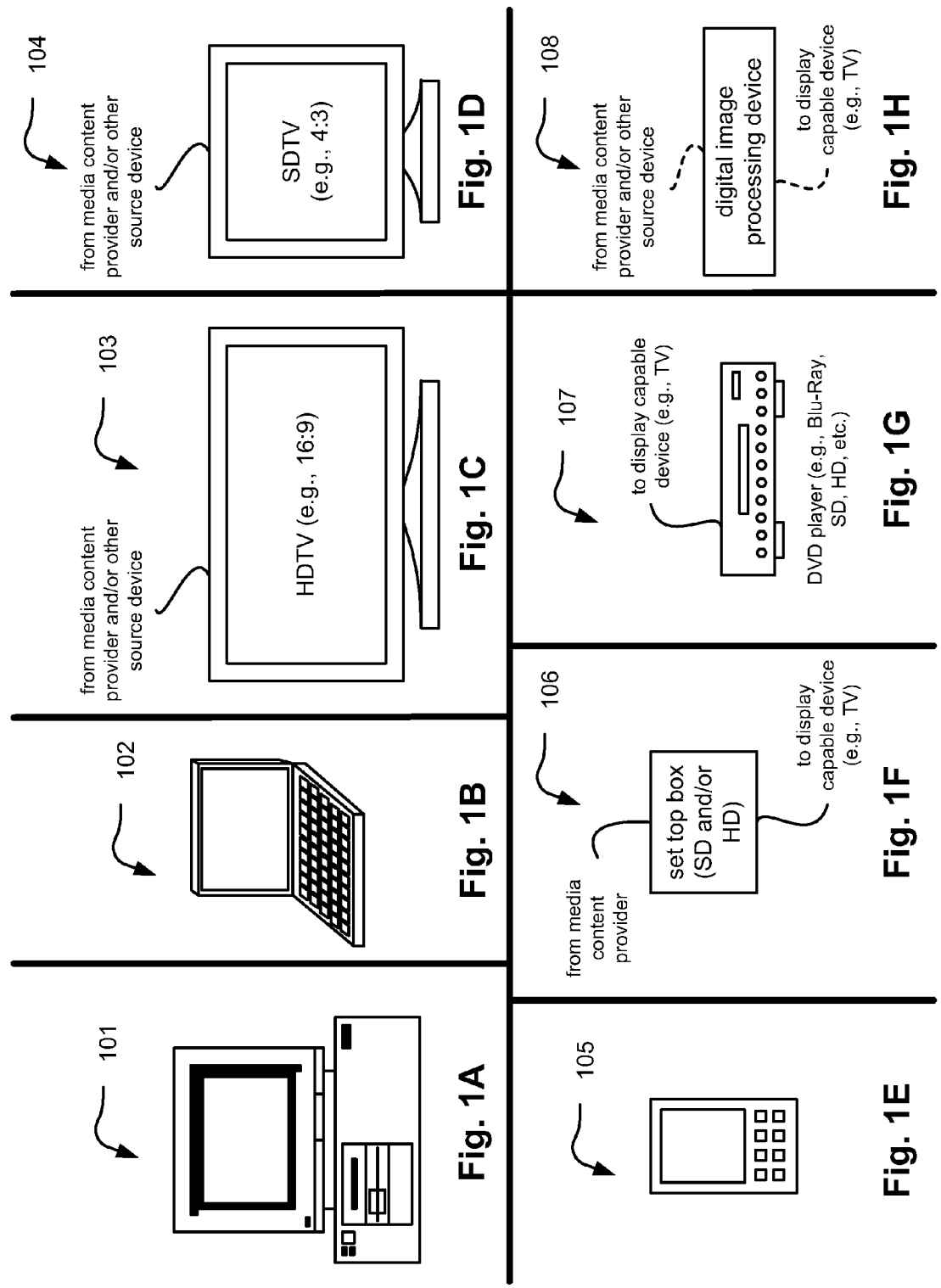

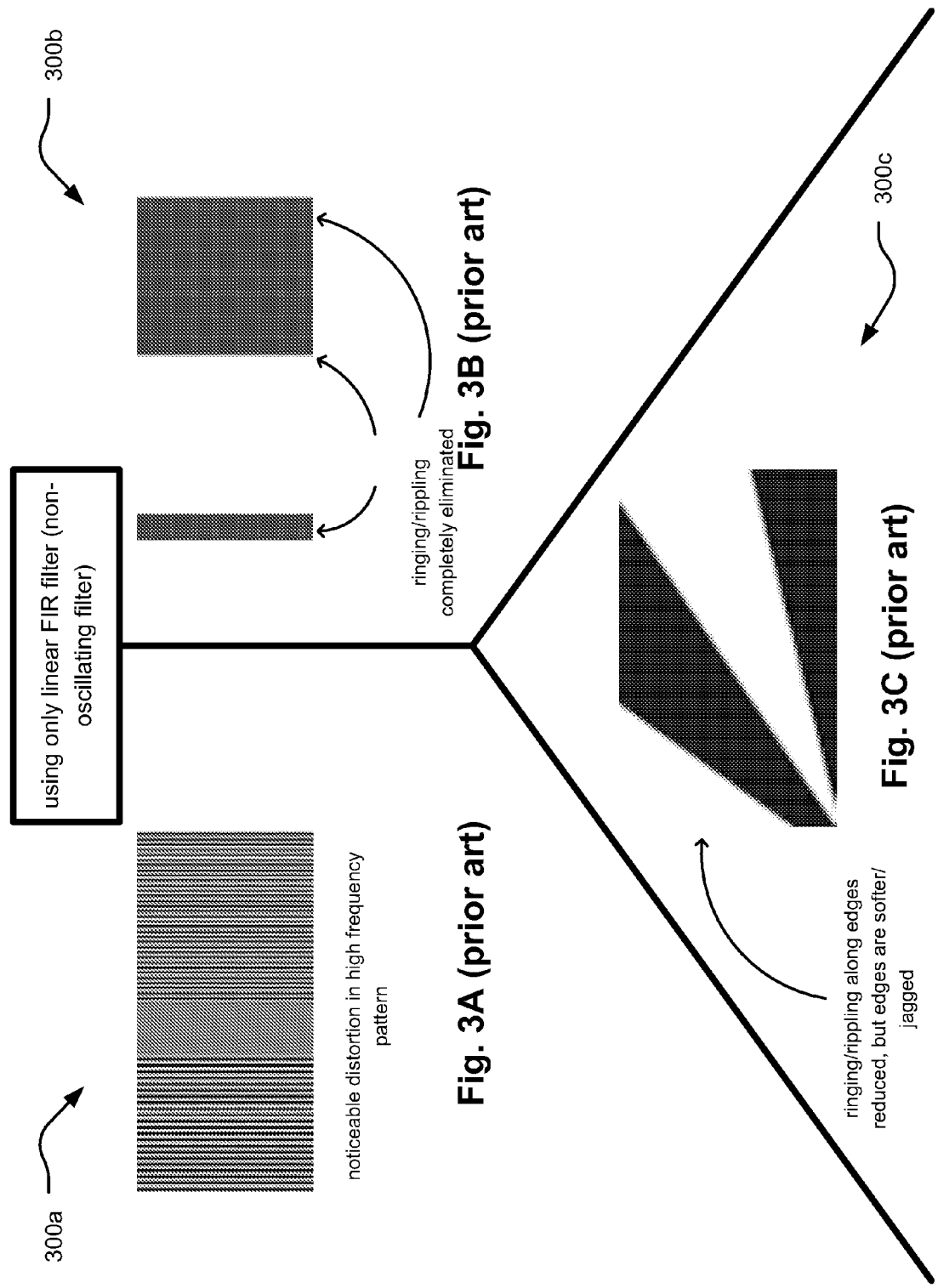

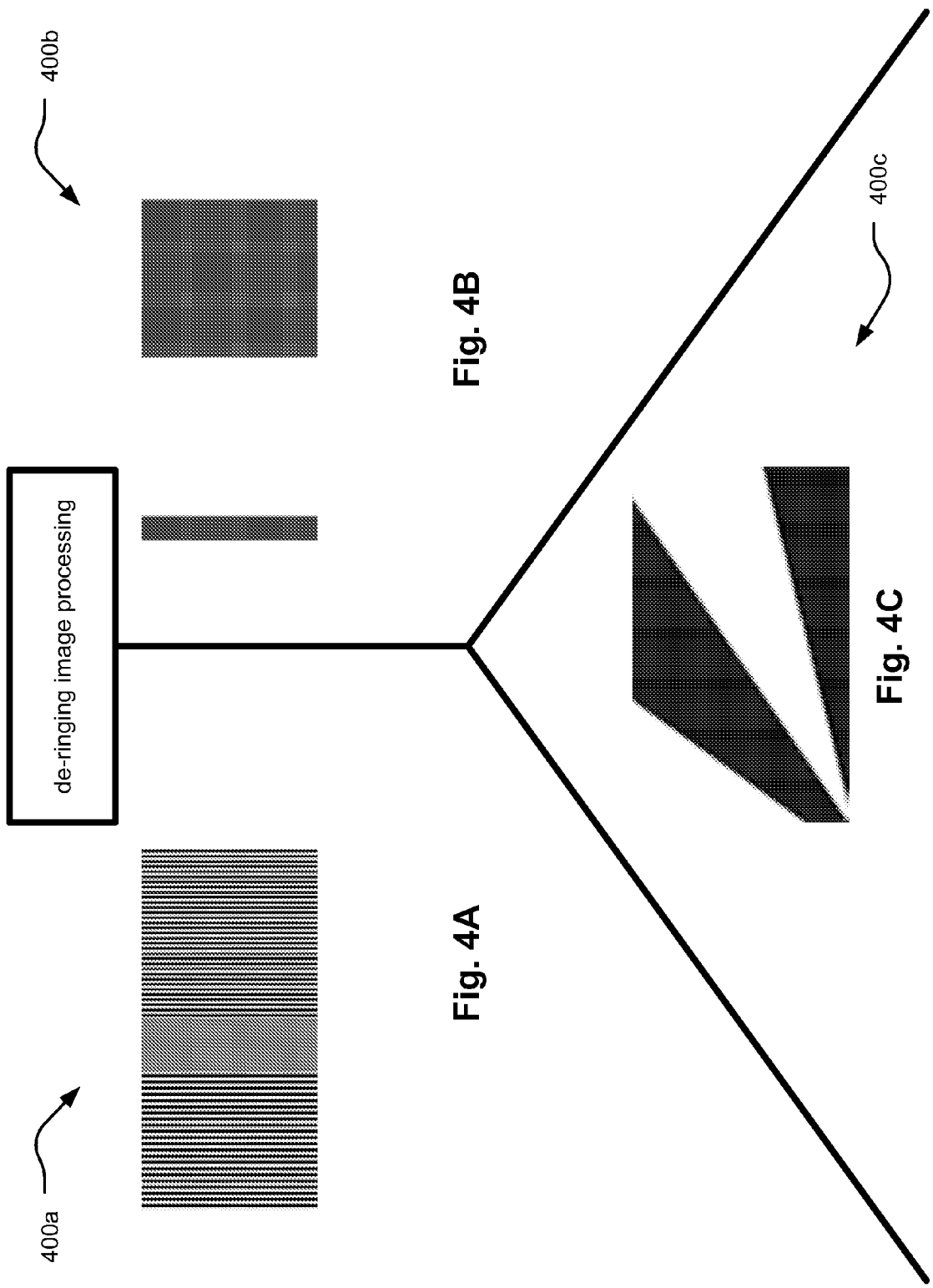

Fig. 7 (4 tap embodiment, num_taps=4)

Fig. 8 (8 tap embodiment, num_taps=8, serial implementation)

Fig. 9 (8 tap embodiment, num_taps=8, parallel implementation)

DE-RINGING OPERATION FOR IMAGE PROCESSING

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/118,557, entitled "De-ringing operation for image processing," filed Nov. 28, 2008.

BACKGROUND OF THE INVENTION

2. Technical Field of the Invention

The invention relates generally to image processing; and, more particularly, it relates to means by which higher quality images may be generated in accordance with such image processing.

3. Description of Related Art

Devices that perform display and processing of digital images exist in a variety of contexts (e.g., computers including desktop, laptop, and handheld computing devices; televisions; media content players including DVD players and set top boxes (STBs); etc.). When processing digital images to perform any up-sampling and/or down-sampling, sometimes the visual quality of the generated/updated digital image is compromised. For example, certain image processing schemes that are directed to preserving high frequency content therein can introduce ringing (sometimes alternatively referred to as rippling or other equivalent terms) near the high frequency content boundaries. This ringing can greatly reduce the quality of the image seen by a user.

Whether the image is a still image being viewed by a user (e.g., on some digital image capable viewing device) or one image of a sequence of images (e.g., such as in digital video stream being viewed on a television (TV)), this degradation of digital images can reduce a user's experience or enjoyment of viewing such digital images.

When scaling an image, in order to preserve high frequencies (sharpness) and prevent aliasing, it is common to use a sharp roll-off multi-tap finite impulse response (FIR) filter. This type of filter will result in a scaled image with accurate high-frequency detail, but will often yield ringing (oscillations) around sharp edges.

In FIG. 2A and FIG. 2B, two input pictures have been scaled up horizontally by a factor of two, using a sharp roll-off multi-tap (oscillating) FIR filter. In FIG. 2C, the picture is the result of an up-scale by 3.

FIG. 2A illustrates an embodiment 200a of a resulting digital image, that includes preserved high frequency content, as generated using only a sharp roll-off, multi-tap finite impulse response (FIR) filter. In FIG. 2A, the high frequency patterns are preserved.

FIG. 2B illustrates an embodiment 200b of a resulting digital image, that includes undesirable ringing/rippling in transition regions/vertical edges, as generated using only a sharp roll-off, multi-tap FIR filter. In FIG. 2B, very undesirable and unwanted ringing or ripples can be seen alongside the vertical edges. While these distortions are expected because of this type of sharp roll-off, multi-tap FIR filter, they are certainly not desirable in the scaled image.

FIG. 2C illustrates an embodiment 200c of a resulting digital image, that includes undesirable ringing/rippling along edges, as generated using only a sharp roll-off, multi-tap FIR filter. In FIG. 2C, the edges are fairly sharp/crisp and clean, but again ringing can be seen along the edges.

Alternative means of performing image processing include using a non-oscillating FIR filter in the scaler (e.g., a linear FIR filter). However, while the use of such a different type of filter will effectively eliminate or reduce rippling and/or ringing, it will either cause the loss of high-frequency details and/or introduce aliasing. In other words, this solution of performing this type of filtering can incur a greater reduction in image quality than the introduction of undesirable and unwanted ringing or ripples as described above.

In FIG. 3A and FIG. 3B, the same pictures as in the example above are scaled up 2 times, horizontally, using a linear filter. In FIG. 3C, the up-scale factor is 3.

FIG. 3A illustrates an embodiment 300b of a resulting digital image, that includes noticeable distortion in high frequency content, as generated using only a linear FIR filter.

FIG. 3B illustrates an embodiment 300b of a resulting digital image, in which ringing/rippling is completely eliminated, as generated using only a linear FIR filter.

In FIG. 3B, it can be seen that that ringing/rippling is completely eliminated; however, in FIG. 3A, there is noticeable distortion in the high-frequency pattern.

FIG. 3C illustrates an embodiment 300c of a resulting digital image, in which ringing/rippling is reduced but that also includes softer/jagged edges, as generated using only a linear FIR filter. In FIG. 3C, there's no more ringing/rippling along the diagonal edges. However the edges are significantly more soft and jagged than before and the overall image quality is significantly reduced.

The prior art approaches to performing image processing simply do not provide an adequate solution that, among other things, preserves high-frequency detail (sharpness) in the output, prevent visible artifacts caused by aliasing, and suppress the rippling/ringing artifacts.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 1A illustrates an embodiment of a computer.

FIG. 1B illustrates an embodiment of a laptop computer.

FIG. 1C illustrates an embodiment of a high definition (HD) television.

FIG. 1D illustrates an embodiment of a standard definition (SD) television.

FIG. 1E illustrates an embodiment of a handheld media unit.

FIG. 1F illustrates an embodiment of a set top box (STB).

FIG. 1G illustrates an embodiment of a digital video disc (DVD) player.

FIG. 1H illustrates an embodiment of a generic digital image processing device.

FIG. 3A illustrates an embodiment of a resulting digital image, that includes noticeable distortion in high frequency content, as generated using only a linear FIR filter.

FIG. 3B illustrates an embodiment of a resulting digital image, in which ringing/rippling is completely eliminated, as generated using only a linear FIR filter.

FIG. 3C illustrates an embodiment of a resulting digital image, in which ringing/rippling is reduced but that also includes softer/jagged edges, as generated using only a linear FIR filter.

FIG. 4A illustrates an embodiment of a resulting digital image, that includes preserved high frequency content, as generated using the selective de-ringing image processing.

FIG. 4B illustrates an embodiment of a resulting digital image, in which ringing/rippling is completely eliminated, as generated using selective de-ringing image processing.

FIG. 4C illustrates an embodiment of a resulting digital image, in which ringing/rippling is completely eliminated while maintaining crisp edges, as generated using selective de-ringing image processing.

DETAILED DESCRIPTION OF THE INVENTION

Figures 2A, 2B, 2C:
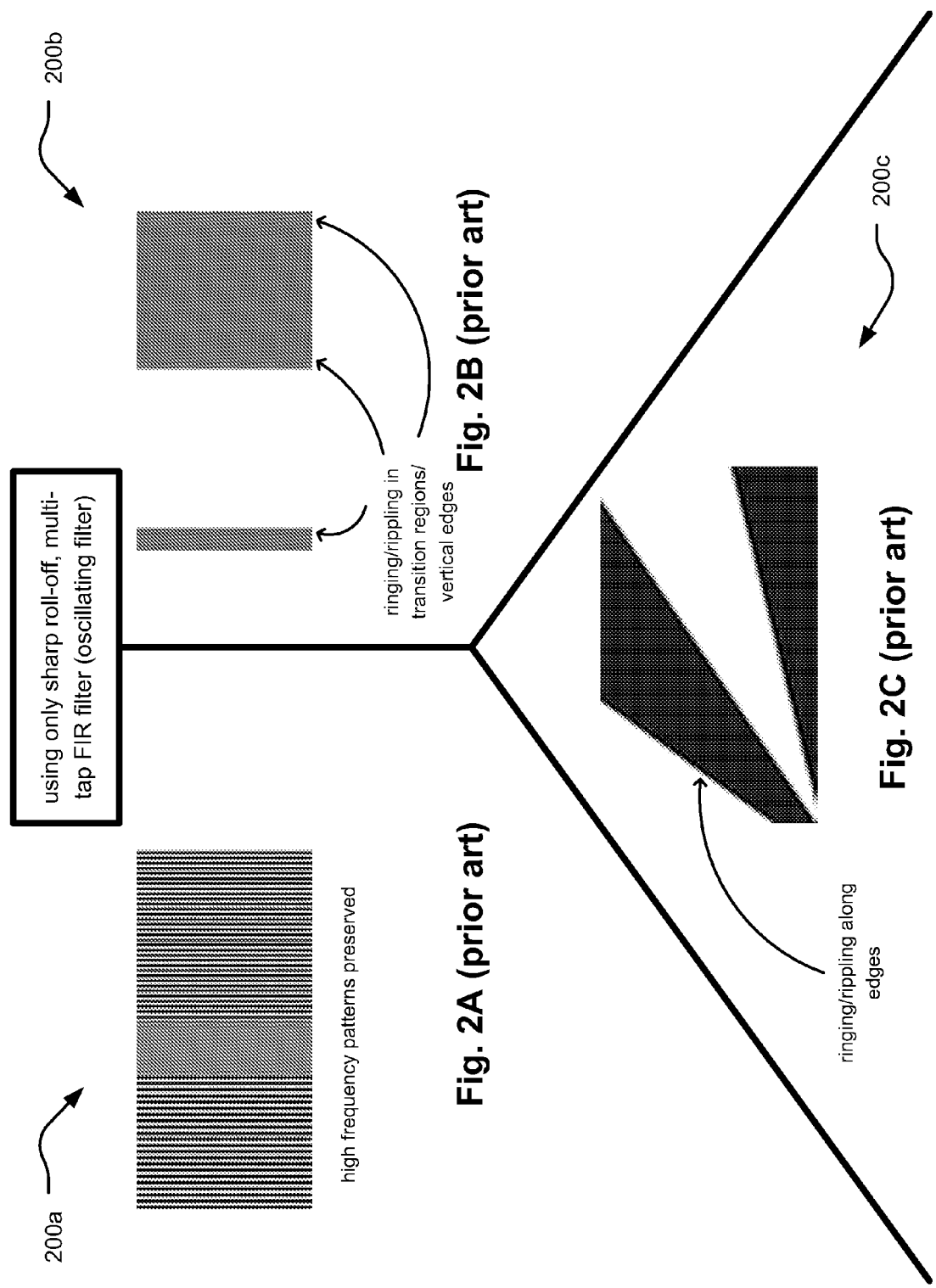
FIG. 2A illustrates an embodiment of a resulting digital image, that includes preserved high frequency content, as generated using only a sharp roll-off, multi-tap finite impulse response (FIR) filter.
FIG. 2B illustrates an embodiment of a resulting digital image, that includes undesirable ringing/rippling in transition regions/vertical edges, as generated using only a sharp roll-off, multi-tap FIR filter.
FIG. 2C illustrates an embodiment of a resulting digital image, that includes undesirable ringing/rippling along edges, as generated using only a sharp roll-off, multi-tap FIR filter.

For virtually all modern digital video systems (e.g., including digital televisions, DVD players, set-top boxes (STB), laptop computers, desktop computers etc.), image re-sampling is a necessary feature (e.g., when performing up or down sampling or for other reasons). Some examples of such image re-sampling include video scaling from standard definition (SD) to high definition (HD), chrominance format conversion (4:2:2, 4:2:0, 4:4:4), over-sampling prior to driving an analog output, and others.

Digital image processing of digital images (including video) may be performed by any of the various devices depicted below in FIG. 1A-1H to allow a user to view such digital images. These various devices do not include an exhaustive list of devices in which the image processing described herein may be effectuated, and it is noted that any generic digital image processing device may be implemented to perform the image processing described herein without departing from the scope and spirit of the invention.

FIG. 1A illustrates an embodiment of a computer 101. The computer 101 can be a desktop computer, or an enterprise storage devices such a server, of a host computer that is attached to a storage array such as a redundant array of independent disks (RAID) array, storage router, edge router, storage switch and/or storage director. A user is able to view still digital images or video (e.g., a sequence of digital images) using the computer 101. Oftentimes, various image viewing programs and/or media player programs are included on a computer 101 to allow a user to view such images (including video).

FIG. 1B illustrates an embodiment of a laptop computer 102. Such a laptop computer 102 may be found and used in any of a wide variety of contexts. In recent years, with the ever-increasing processing capability and functionality found within laptop computers, they are being employed in many instances where previously higher-end and more capable desktop computers would be used. As with the computer 101, the laptop computer 102 may include various image viewing programs and/or media player programs to allow a user to view such images (including video).

FIG. 1C illustrates an embodiment of a high definition (HD) television 103. Many HD televisions 103 include an integrated tuner to allow the receipt, processing, and decoding of media content (e.g., television broadcast signals) thereon. Alternatively, sometimes an HD television 103 receives media content from another source such as a digital video disc (DVD) player, set top box (STB) that receives, processes, and decodes a cable and/or satellite television broadcast signal. Regardless of the particular implementation, the HD television 103 may be implemented to perform image processing as described herein. Generally speaking, an HD television 103 has capability to display HD media content and oftentimes is implemented having a 16:9 widescreen aspect ratio.

FIG. 1D illustrates an embodiment of a standard definition (SD) television 104. Of course, an SD television 104 is somewhat analogous to an HD television 103, with at least one difference being that the SD television 104 does not include capability to display HD media content, and an SD television 104 oftentimes is implemented having a 4:3 full screen aspect ratio. Nonetheless, even an SD television 104 may be implemented to perform image processing as described herein.

FIG. 1E illustrates an embodiment of a handheld media unit 105. A handheld media unit 105 may operate to provide general storage or storage of image/video content information such as joint photographic experts group (JPEG) files, tagged image file format (TIFF), bitmap, motion picture experts group (MPEG) files, Windows Media Architecture (WMA) files, other types of video content such as MPEG4 files, etc. for playback to a user, and/or any other type of information that may be stored in a digital format. Historically, such handheld media units were primarily employed for storage and playback of audio media; however, such a handheld media unit 105 may be employed for storage and playback of virtual any media (e.g., audio media, video media, photographic media, etc.). Moreover, such a handheld media unit 105 may also include other functionality such as integrated communication circuitry for wired and wireless communications. Such a handheld media unit 105 may be implemented to perform image processing as described herein.

FIG. 1F illustrates an embodiment of a set top box (STB) 106. As mentioned above, sometimes a STB 106 may be implemented to receive, process, and decode a cable and/or satellite television broadcast signal to be provided to any appropriate display capable device such as SD television 104 and/or HD television 103. Such an STB 106 may operate independently or cooperatively with such a display capable device to perform image processing as described herein.

FIG. 1G illustrates an embodiment of a digital video disc (DVD) player 107. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 104 and/or HD television 103. The DVD player 105 may be implemented to perform image processing as described herein.

FIG. 1H illustrates an embodiment of a generic digital image processing device 108. Again, as mentioned above, these various devices described above do not include an exhaustive list of devices in which the image processing described herein may be effectuated, and it is noted that any generic digital image processing device 108 may be implemented to perform the image processing described herein without departing from the scope and spirit of the invention.

Generally, one basic mechanism that may be employed for digital image re-sampling is the Poly-Phase Filter Bank, which typically involves the application of finite impulse response (FIR) digital filters to interpolate between input image samples. While this image processing technique has some benefits, it can suffer from at least the following deficiencies: with regards to smoothness, aliasing, and ringing/rippling. Smoothness deficiencies may arise where the filter makes the image very soft by attenuating the high frequencies in the pass-band. Aliasing deficiencies may arise in accordance with the re-sampling process (that includes filtering) where the re-sampling process incorrectly introduces energy at some frequencies, causing, for example, jaggedness along edges. Ringing deficiencies may arise where the filter introduces oscillations around edges. In some instances, this FIR digital filter can be adjusted to address one or at most two of these deficiencies; however, there is not sufficient flexibility to address all three of these deficiencies at a time.

Some prior art approaches to dealing with these various image processing drawbacks and deficiencies are described with respect to FIGS. 2A-3C.

For detailed descriptions of the prior art embodiment of FIGS. 2A-3C, the reader is directed to the "DESCRIPTION OF RELATED ART" section herein.

As mentioned above, many prior art approaches to performing image processing perform re-sampling (e.g., up or down conversion) do not adequately address the various parameters of preserving high-frequency detail (sharpness) in the output, preventing visible artifacts caused by aliasing, and suppressing the rippling/ringing artifacts.

Generally speaking, most re-sampling devices choose by default to favor sharpness and aliasing rejection at the expense of rippling/ringing that may be introduced. Herein, a novel and improved image processing approach is presented by which all of these various goals (e.g., of preserving high-frequency detail (sharpness) in the output, preventing visible artifacts caused by aliasing, and suppressing the rippling/ringing artifacts) are addressed.

Rather than employing only one single type of filtering and/or processing of a digital image, selective image processing is performed to generate various output values for sample locations within the digital image based on certain measures calculated within the vicinity of the desired output location.

For example, rather than using only one type of filter module, the image processing herein uses both an oscillating and a non-oscillating FIR filters, and it selectively applies the filters to create each output sample. For example, there is a soft-clamping operation (e.g., sometimes alternatively referred to as a clamping function) that operates in between the two filters by progressively transitioning from one filter to the other.

However, it is noted that de-ringing operation for image processing presented herein doesn't necessarily remove pre-existing ringing that may be present in the input digital image content. Rather, the de-ringing operation for image processing presented herein operates to prevent the re-sampling and filtering logic in accordance with image and/or video processing from inserting ringing in the output content.

The de-ringing operation for image processing presented herein can be used for any re-sampling ratio, whether up-sampling or down-sampling, for any color component (Y/Cb/Cr/R/G/B), and in any type of content (video or graphics).

The de-ringing operation for image processing presented herein operates by recognizing regions within an image that may be prone to rippling/ringing artifacts that may be incurred when performing image processing. For example, considering the example scaled images given within FIGS. 2A-3C, it is apparent that rippling/ringing is visible around sharp object edges.

Within those deleteriously affected regions, in general, the de-ringing operation for image processing presented herein alternatively makes use of a non-oscillating filter to compute the output samples around the edge. This makes sure that no ringing and/or no rippling is created. Also, when up-sampling (increasing the sampling rate), the de-ringing operation for image processing presented herein makes sure to use the oscillating filter right along the edge itself. This yields clean and crisp edges that are sharp and non-aliased.

When down-sampling, the de-ringing operation for image processing presented herein employs the non-oscillating filter. In other regions, the de-ringing operation for image processing presented herein also makes use of the oscillating filter, at least in part, thus preserving details as much as possible.

FIG. 4A, FIG. 4B, and FIG. 4C show the output of the de-ringing operation for image processing presented herein, when applied to the same pictures used previously, with the same up-scaling ratios of 2 (e.g., FIG. 4A and FIG. 4B described below) or 3 (e.g., FIG. 4C described below).

FIG. 4A illustrates an embodiment 400a of a resulting digital image, that includes preserved high frequency content, as generated using the selective de-ringing image processing.

FIG. 4B illustrates an embodiment 400b of a resulting digital image, in which ringing/rippling is completely eliminated, as generated using selective de-ringing image processing.

FIG. 4C illustrates an embodiment 400c of a resulting digital image, in which ringing/rippling is completely eliminated while maintaining crisp edges, as generated using selective de-ringing image processing.

As can be seen, in FIG. 4A, the multi-burst pattern is preserved while the sharp edges of FIG. 4B and FIG. 4C don't show rippling/ringing. The diagonal edges of FIG. 4C are not jagged (e.g., they are crisp)

Figure 5:
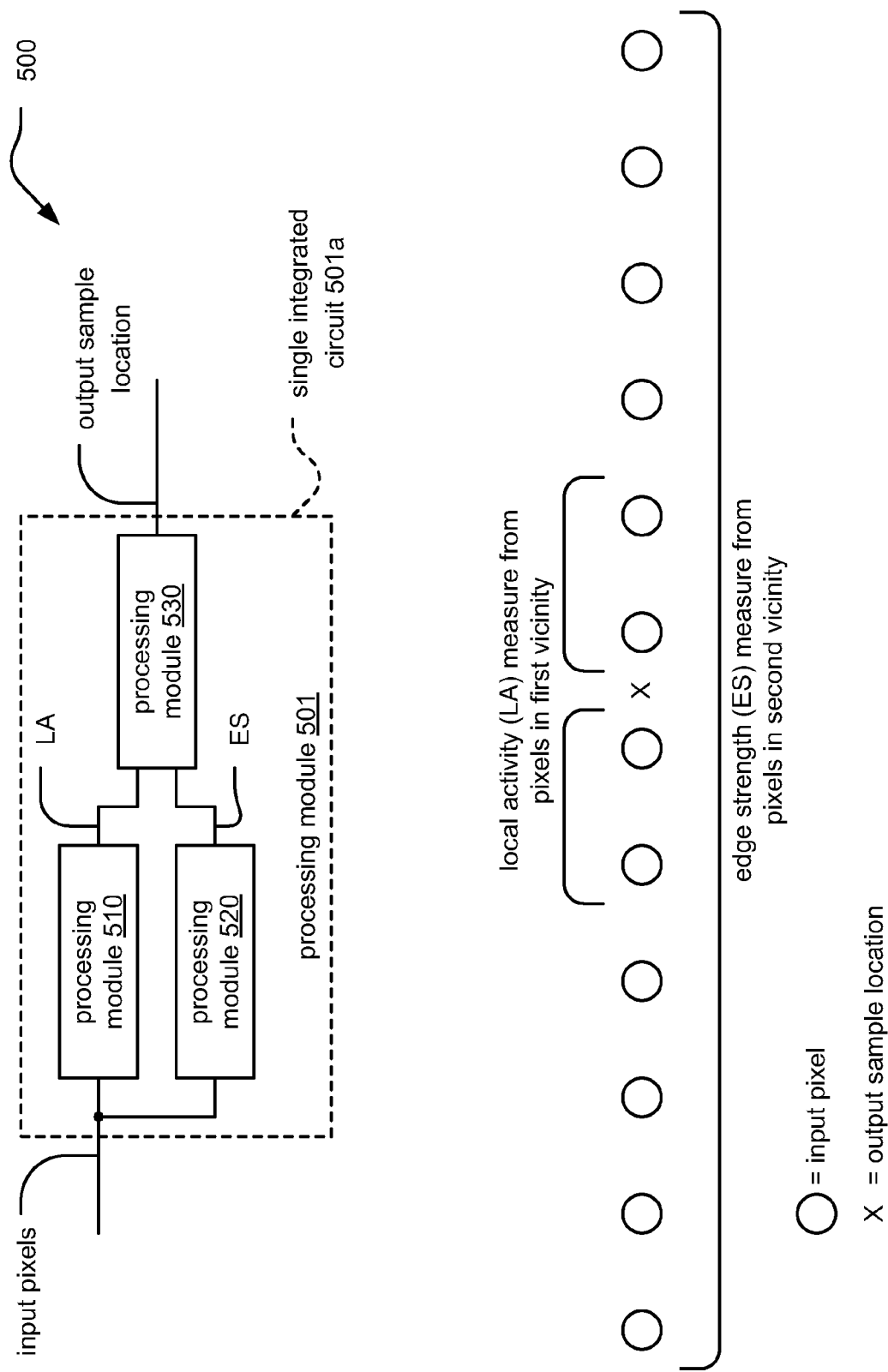
FIG. 5 illustrates an embodiment showing various groups of pixels being processed to generate two measures (e.g., local activity (LA) and edge strength (ES)) in accordance with generating an output sample using the selective de-ringing image processing.

FIG. 5 illustrates an embodiment 500 showing various groups of pixels being processed to generate two measures (e.g., local activity (LA) and edge strength (ES)) in accordance with generating an output sample using the selective de-ringing image processing.

The image processing performed herein may be performed within a single module (e.g., as pictorially shown in the diagram by processing module 501 and/or single integrated circuit 501a) or multiple modules (e.g., as pictorially shown in the diagram by processing modules 510, 520, and 530) as may be desired in a particular application. For example, any device that includes capability to perform the various image processing operations can include a single processing module or multiple processing modules therein to effectuate such image processing.

At the top of this diagram, a first processing module 510 processes a first group of pixels within a first vicinity near a sample location thereby generating a local activity (LA) measure. Then, a second processing module 520 processes a second group of pixels within a second vicinity near the sample location thereby generating an edge strength (ES) measure. A third processing module 530 then relatively compares the LA measure and the ES measure and, based on the relative comparison of the LA measure and the ES measure, either selectively performs or selectively directs processing of the first group of pixels and/or the second group of pixels thereby generating an output value for the sample location.

As can be seen in the diagram, the LA and ES measures correspond to different groups of pixels near the desired sample location. The group of pixels employed to generate the LA measure may be a subset of the group of pixels employed to generate the ES measure in some embodiments.

Generally speaking, recognition of areas prone to ringing is done by examining and analyzing the input image pixels/samples surrounding the desired output sample location. These two measurements (LA measure and ES measure) and are made using the input sample values as shown in the diagram.

The LA measure is a measurement of the frequency content of the input pixels immediately surrounding the output sample point. For image regions with high-frequency details, the LA measure will typically be high, and for smooth regions, the LA measure will typically will be low.

The ES measure is also a measurement of frequency content, but over a relatively larger region of input pixels around the desired output sample location. In some embodiments, the size of this region is given by the number of taps of the oscillating filter (e.g., the multi-tap oscillating filter).

Generally, the basic purpose of the ES measure allows the identification of a presence of a high energy sharp edge in the extended neighborhood that is susceptible to generate rippling/ringing, while the LA measure is used to identify regions that are susceptible to show ringing (e.g., low LA value). A combination of a high ES (higher ringing amplitude) with a low LA (increased susceptibility to show ringing) is the worst case when it comes to ringing).

Considering the example images described above with ringing artifacts (e.g., FIGS. 2A-3C), in the areas around the sharp edges of FIG. 4B and FIG. 4C, the following observations may be made.

The LA measure would be relatively low, as these few pixels would be drawn from a smooth region. However, the ES measure would be relatively high, as the pixels from the extended window would contain the sharp edge.

It is in regions like this (e.g., relatively lower LA measure and relatively high ES measure) in which that rippling/ringing is typically found. By using a non-oscillating filter in those particular regions, visible rippling/ringing can be suppressed. Moreover, by selectively applying a clamping function to generate the output value for the sample location, an even better image quality can be achieved.

Figure 6:
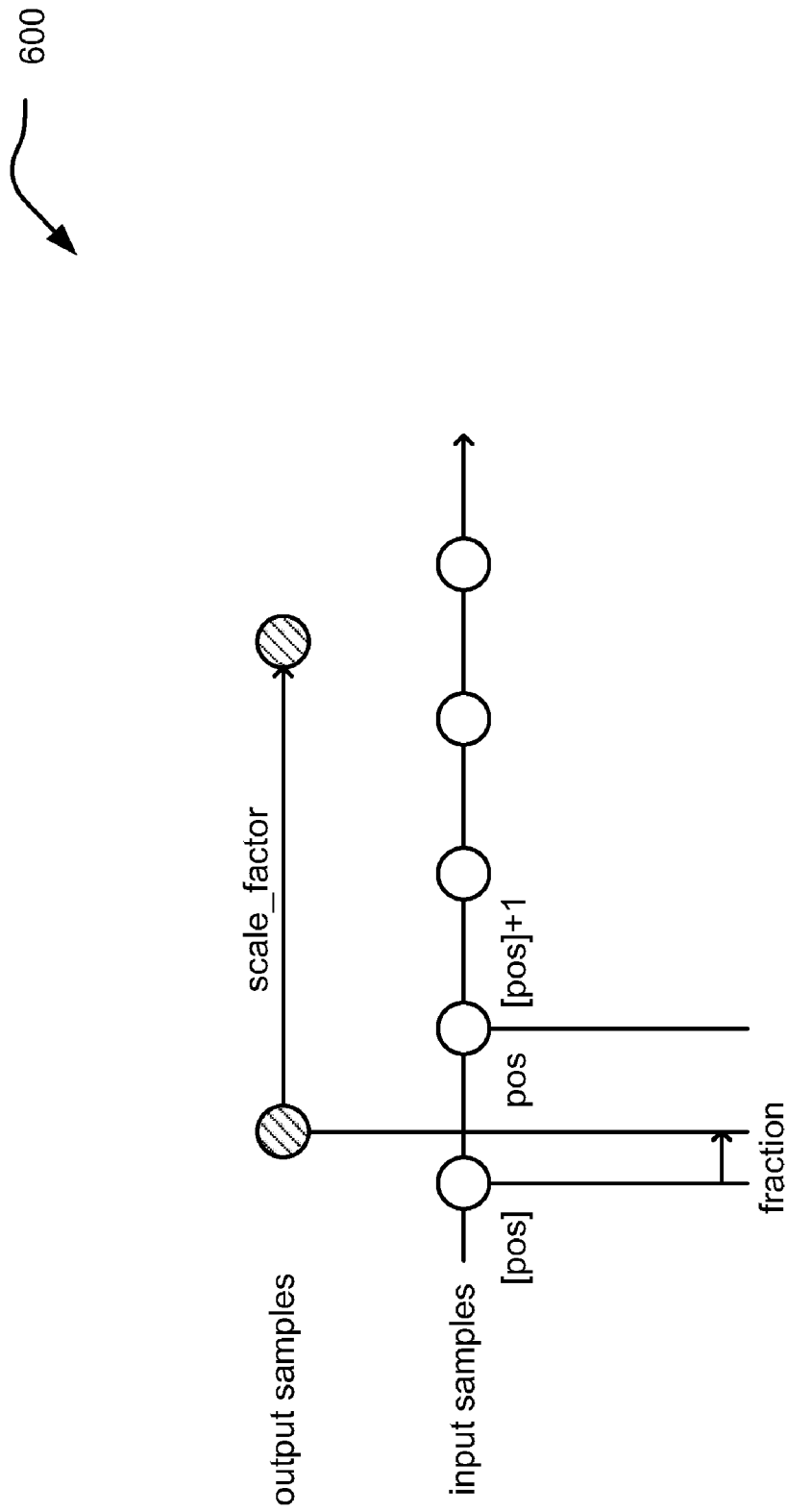
FIG. 6 illustrates an embodiment of scaling vocabulary as may be employed to describe possible implementations of LA measure and ES measure calculation.

FIG. 6 illustrates an embodiment 600 of scaling vocabulary as may be employed to describe possible implementations of LA measure and ES measure calculation.

The de-ringing operation for image processing presented herein employs on edge detection and the strength of the edge relatively to a local measure of variance. As the relative strength increases, the output of the normal filter is further clamped around a fallback value that is ringing-free. It is uni-directional and can be applied both horizontally and vertically when processing various digital images. The de-ringing operation for image processing presented herein also can be applied to any component (luma/chroma/R,G,B, etc.) of a digital image.

Referring again to FIG. 6, an output sample has a fractional position in the input sample grid: pos. Various vocabulary is provided below that is used to describe some possible means by which LA measure and ES measure may be calculated for various groups of pixels.

[pos] is the index of the input sample that immediately precedes the output sample.

[pos]+1 is the index of the input sample that immediately follows the output sample.

fraction=pos−[pos] is the fractional position of the output sample between the 2 immediate input sample neighbors.

The normal filter is the filter applied to the signal that is susceptible to ring.

filter_taps is the number of taps of the normal low pass filter, which ringing we are attempting to eliminate.

scale_factor is a down-scale factor representing the ratio of input samples to output samples in a scaler. A value greater than 1 indicates down-scaling.

Figure 7:
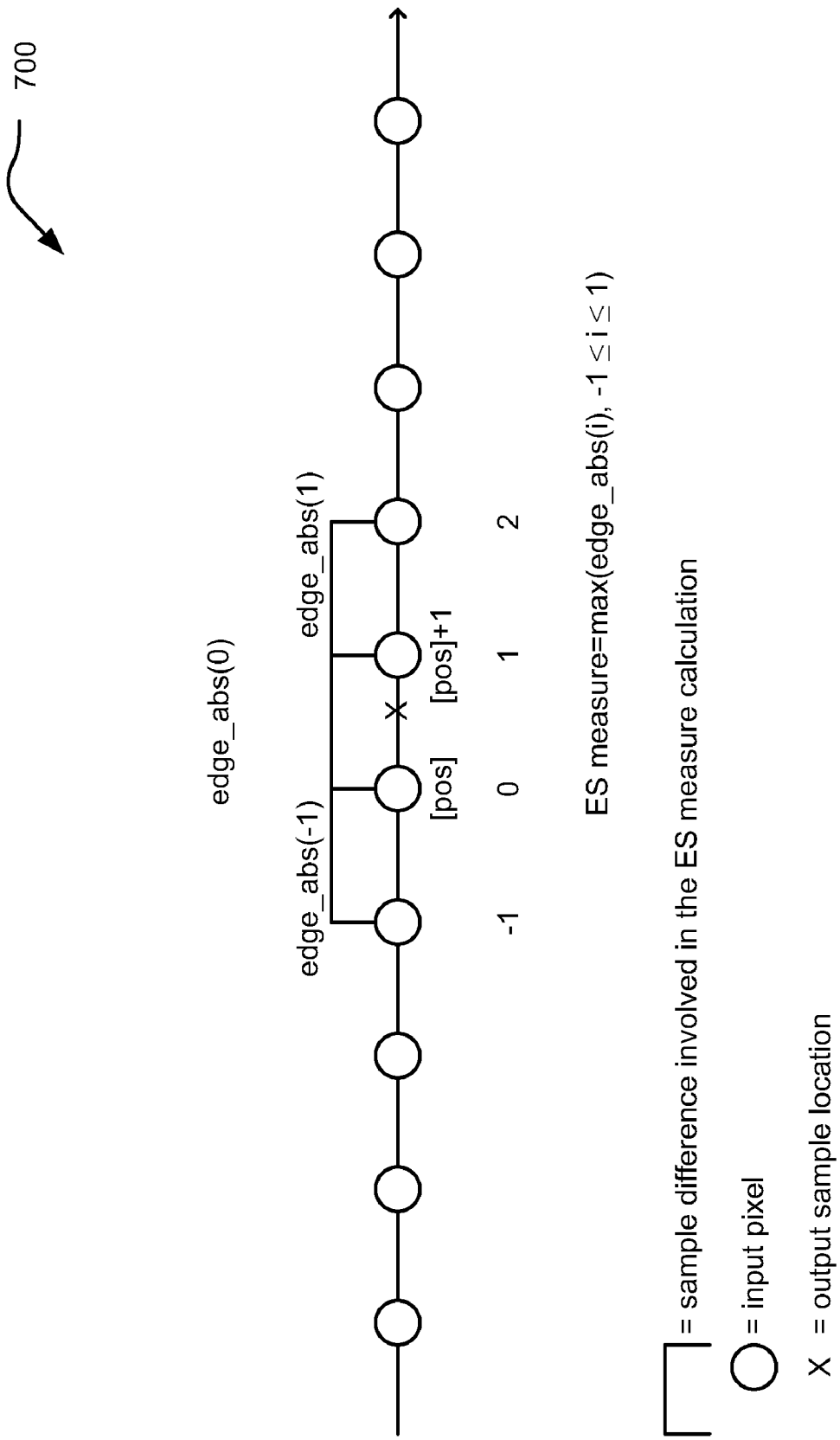
FIG. 7 illustrates an embodiment of ES measure calculation.

FIG. 7 illustrates an embodiment 700 of ES measure calculation.

Input: filter_taps input samples around the output sample position.

One possible description of edge_strength is that it is proportional to the maximum sample-to-sample transition within the input kernel around the output sample position.

In one embodiment, edge_strength may by computed using computer executable code as follows:

```
edge_strength = 0;
FOR (i = [pos] − filter_taps/2 + 1; i = [pos] + filter_taps/2 − 1; i++) {
    edge_abs = ABS(input_sample[i] − input_sample[i+1];
    edge_strength = MAX(edge_strength, edge_abs);
}
```

However, in wide filters (e.g., >=12 taps), a protection scheme may implemented so as to avoid detecting high amplitude edges within high frequency bursts (close to $F_s/2$) (for example: sine signal in a multi-burst pattern).

A burst whose frequency is close to $F_s/2$ shows a characteristic low frequency sinusoidal envelope which lows may have a much lower amplitude than its peaks. If the filter kernel that is used is much wider than the local activity (LA) measurement window, it is possible, while creating output samples in a "low" region to measure:

a. A low local_activity;

b. A very high edge_strength, as the input kernel centered around the output position may include a peak of the envelope;

c. A high edge_strength/local_activity ratio.

Such a configuration could result in heavy clamping of the output sample around the fallback sample.

In the case of up-sampling: the wide original filter would have been expected mostly to remove the envelope. De-ringing would prevent that.

In the case of down-sampling: the wide original filter would have been expected to prevent aliasing and to actually kill the sine signal. De-ringing would prevent the signal from being removed.

In certain embodiments, the protection scheme is not implemented by default. Its use will always be specifically mentioned for a given implementation that requires it.

This image processing approach involves sample-to-sample differences between input samples that are 2 positions apart. If implemented, 2 versions may be considered, depending on whether the differences are computed serially or in parallel.

Figure 8:
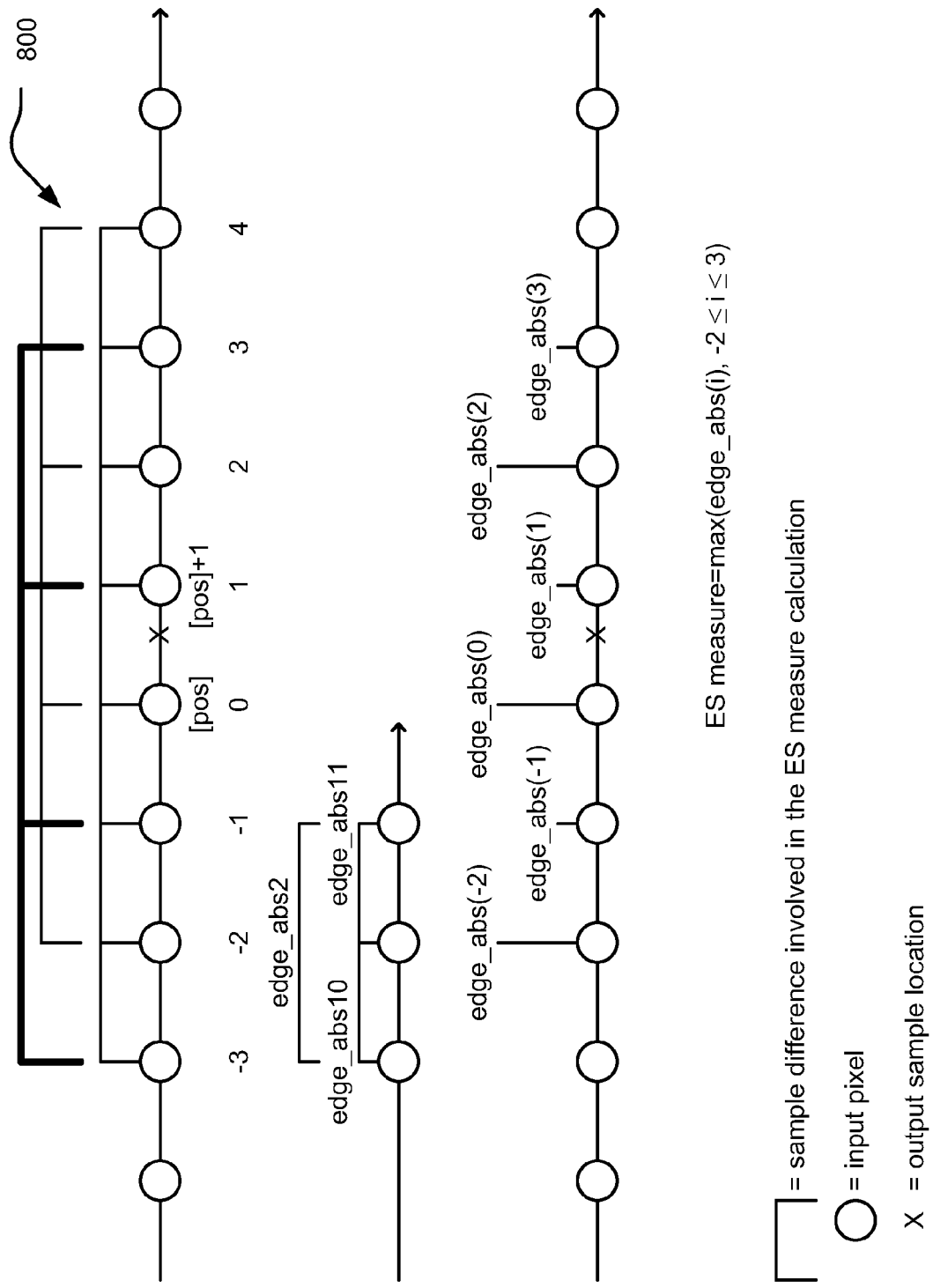
FIG. 8 illustrates an alternative embodiment of ES measure calculation (showing a serial implementation).

FIG. 8 illustrates an alternative embodiment 800 of ES measure calculation (showing a serial implementation). There are different means by which the ES measure calculation may be implemented. This diagram shows a serial implementation.

The computation of the ES measure may be effectuated by the following computer executable code:

```
edge_strength = 0;
FOR (i = [pos] – filter_taps/2 + 1; i = [pos] + filter_taps/2 – 2; i++) {
    edge_abs2 = ABS(input_sample[i] – input_sample[i+2]);
    edge_abs10 = ABS(input_sample[i] – input_sample[i+1]);
    edge_abs11 = ABS(input_sample[i+1] – input_sample[i+2]);
    edge_abs = MIN[edge_abs2, MAX(edge_abs10, edge_abs11)];
    edge_strength = MAX(edge_strength, edge_abs);
}
```

Figure 9:
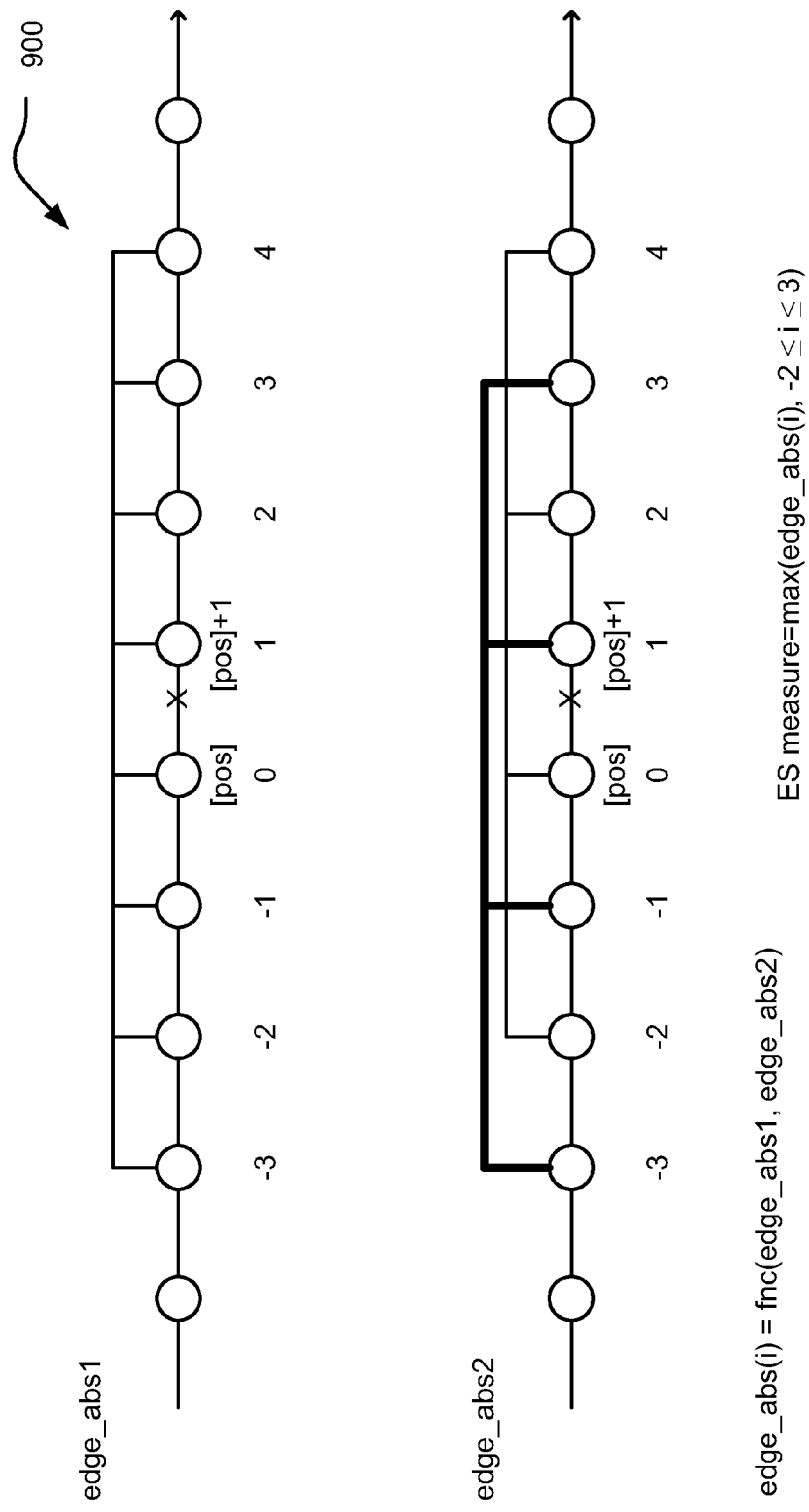
FIG. 9 illustrates an alternative embodiment of ES measure calculation (showing a parallel implementation).

FIG. 9 illustrates an alternative embodiment 900 of ES measure calculation (showing a parallel implementation). In an actual implementation, the parallel implementation of this embodiment may be implemented for a comparable cost as the serial implementation (of previous embodiment) thereby leaving the choice primarily to a designer's preference.

Again, there are different means by which the ES measure calculation may be implemented. This diagram shows a serial parallel.

The computation of the ES measure may be effectuated by the following computer executable code:

```
edge_strength1 = 0;
edge_strength2 = 0;
FOR (i = [pos] – filter_taps/2 + 1; i = [pos] + filter_taps/2 – 1; i++) {
    edge_abs = ABS(input_sample[i] – input_sample[i+1]);
    edge_strength1 = MAX(edge_strength1, edge_abs);
}
FOR (i = [pos] – filter_taps/2 + 1; i = [pos] + filter_taps/2 – 2; i++) {
    edge_abs = ABS(input_sample[i] – input_sample[i+2]);
    edge_strength2 = MAX(edge_strength2, edge_abs);
}
edge_strength = MIN(edge_strength1, edge_strength2);
```

With respect to this embodiment 900, the first diagram corresponds to the calculation of edge_abs1, the second diagram corresponds to the calculation of edge_abs2, and the value of edge_abs(i) may be viewed as being a combination of them both (e.g., a function of them both).

Figure 10:
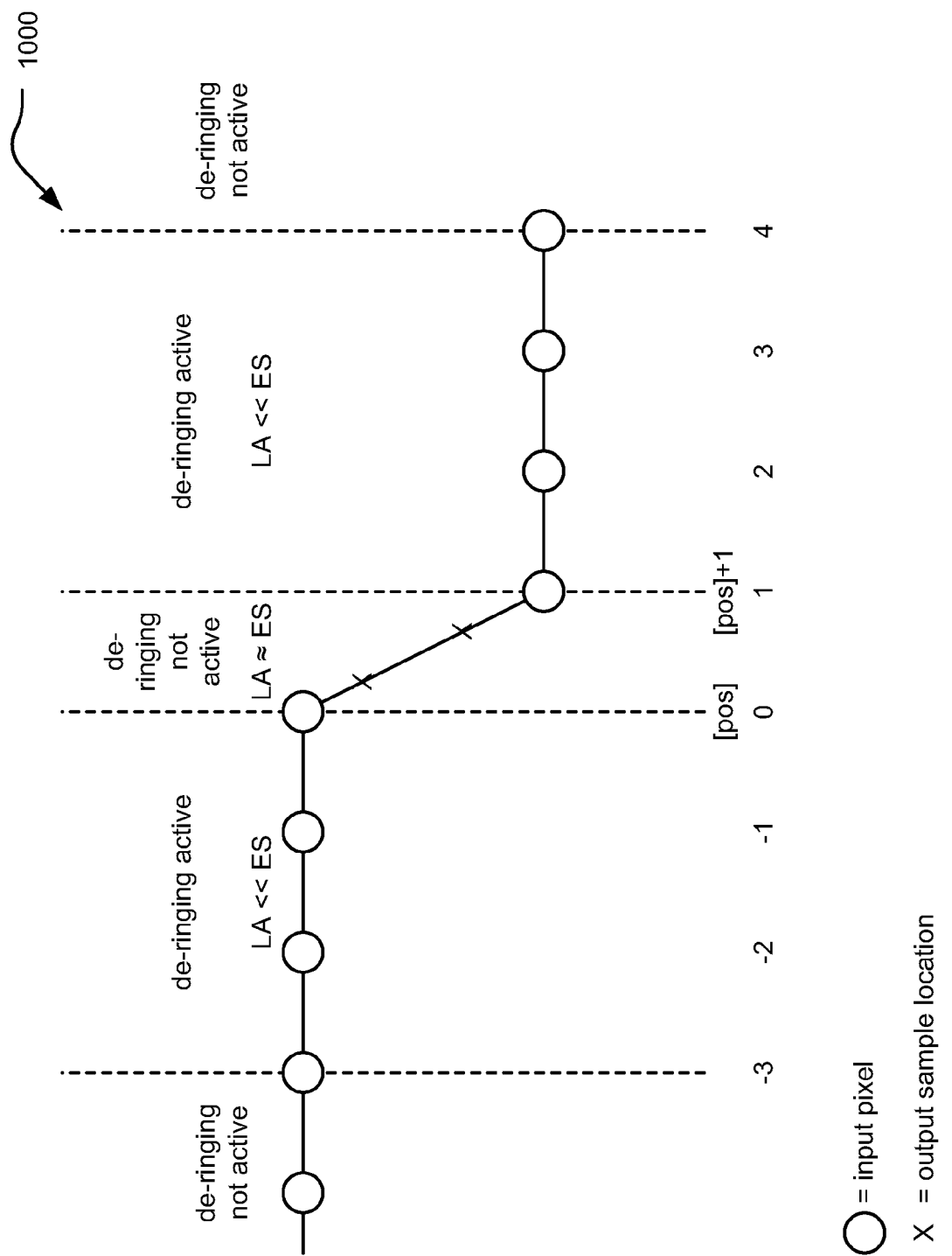
FIG. 10 illustrates an embodiment of overlap LA measure and disabling of de-ringing clamping around an edge.

FIG. 10 illustrates an embodiment 1000 of overlap LA measure and disabling of de-ringing clamping around an edge. The LA measure is calculated from the input samples, within ±local_activity_range around the output sample location.

The local_activity_range is defined as follow:

```
local_activity_range = (scale_factor < 1) ? 3 : (int) (scale_factor + 1.5);
local_activity_range = (scale_factor < 1) ? MIN (filter_taps/2, local_activity_range) :
                                            MIN(filter_taps/2–1, local_activity_range);
local_activity_range = (local_activity_range > 5) ? 5 : local_activity_range;
```

"Before" and "after" local activities are measured. Each one-sided local activity is defined as the MAX of the absolute value of the neighbor-to-neighbor differences within local_activity_range samples.

The selection of the input samples within local_activity_range depends on scale_factor and fraction.

```
before_offset = (scale_factor < 1) ? 1 : (fraction >= 0.75) ? 1 : 0;
after_offset = (scale_factor < 1) ? 1 : (fraction <= 0.25) ? 1 : 0;
``` before_activity, after_activity and local_activity are computed as follow:

```
before_activity = 0;
after_activity = 0;
FOR (i = 0; i < (local_activity_range); i ++) {
    before_activity = MAX( before_activity,
                ABS(input_sample[ [pos]+before_offset–i ]
                – input_sample[ [pos]+before_offset–i–1 ] ) );
    after_activity = MAX( after_activity,
                ABS(input_sample[ [pos]+1–after_activity+i ]
                –input_sample [ [pos]+1–after_activity+i+1 ] ) );
}
local_activity = MIN(before_activity, after_activity);
```

Certain characteristics of the LA measure are described below. When up-scaling, the before_activity and after_activity ranges overlap over the input samples segment that contains the output sample. This guarantees that if the ES measure (edge_strength) is measured in that segment, any output sample within that segment is calculated using the original filter, without any de-ringing clamping.

Indeed in that segment, it may be noted that local_activity=edge_strength. (e.g., LA measure is approximately equal to ES measure).

This may significantly improve the sharpness of the picture. This behavior is possible whenever an "all pass" low pass filter with a flat pass-band is used.

The following observations can also be made.

The local_activity_range increases with scale_factor so as to include the locations of the immediately preceding and following output samples.

Figure 11:
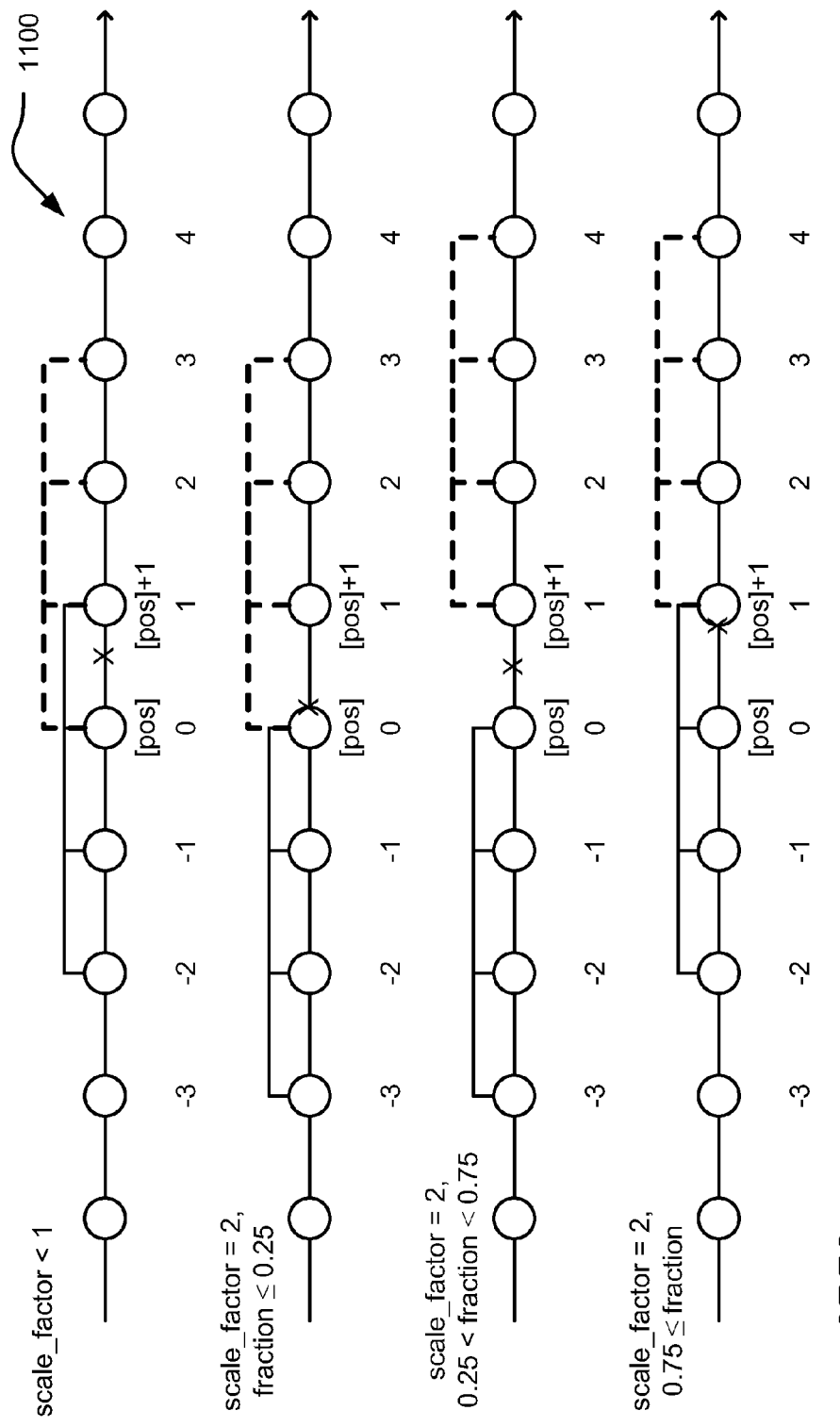
FIG. 11 illustrates an embodiment of different sample differences employed in accordance with LA calculation.

The local_activity is defined as the MIN of before_activity and after_activity. Ringing can be expected to be visible whenever the input signal is flat on either side of the output sample FIG. 11 illustrates an embodiment 1100 of different sample differences employed in accordance with LA calculation. This diagram shows the neighboring pixel groups that are employed with respect to different desired locations of an output sample (e.g., in this embodiment shown in various locations between 0 and 1).

Figure 12:
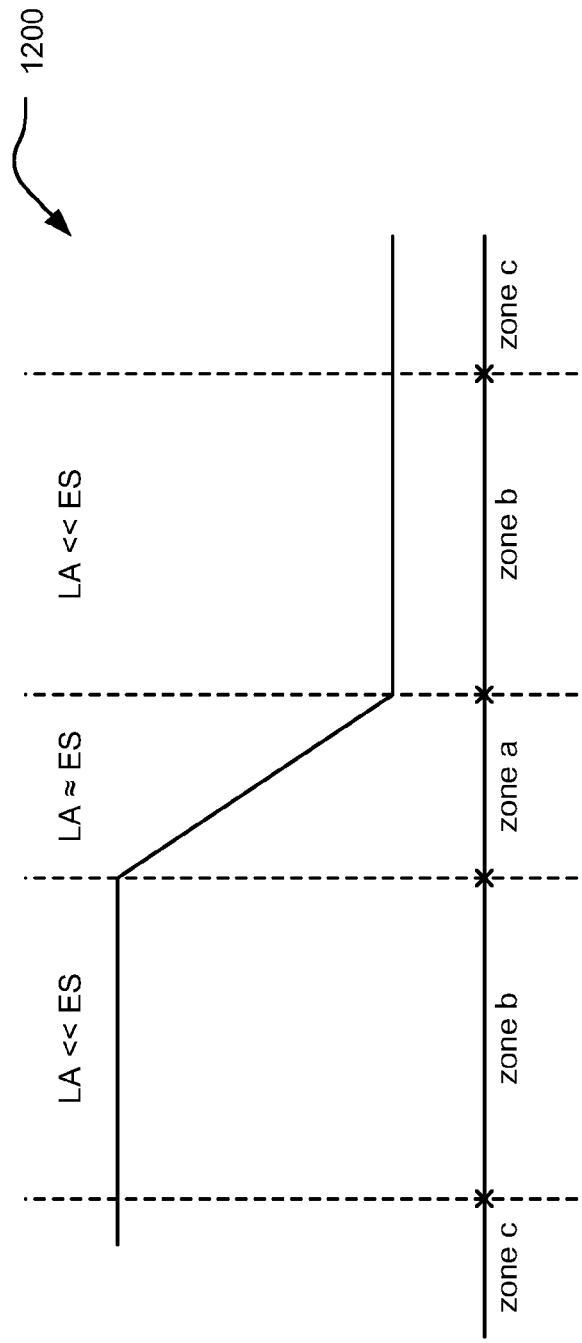
FIG. 12 illustrates an embodiment showing various regions of a digital image and the relative relationships between LA and ES therein.

FIG. 12 illustrates an embodiment 1200 showing various regions of a digital image and the relative relationships between LA and ES therein.

When performing up-sampling image processing, these various LA and ES measures may be used to identify at least 3 different types of areas as shown in FIG. 12.

a. zone a: on a sharp edge;
    b. zone b: around an edge
    c. zone c: away from any edge.

In cases of zone (a) and zone (c), the de-ringing operation for image processing presented herein tends to use an oscillating filter. However, while in zone (b), the de-ringing operation for image processing presented herein tends to use a non-oscillating filter and selectively employs a clamping function as well. In other words, selective filtering is applied to various portions of a digital image based on the particular characteristics of the pixel groups neighboring the desired output location.

Also, when the de-ringing operation for image processing presented herein performs down-sampling, zone (a) is no longer used and falls within zone (b).

FIG. 13, FIG. 14, FIG. 15, and FIG. 16 illustrate various embodiments 1300, 1400, 1500, and 1600, respectively, of selective image processing to generate an output sample using selective de-ringing image processing.

Figure 13:
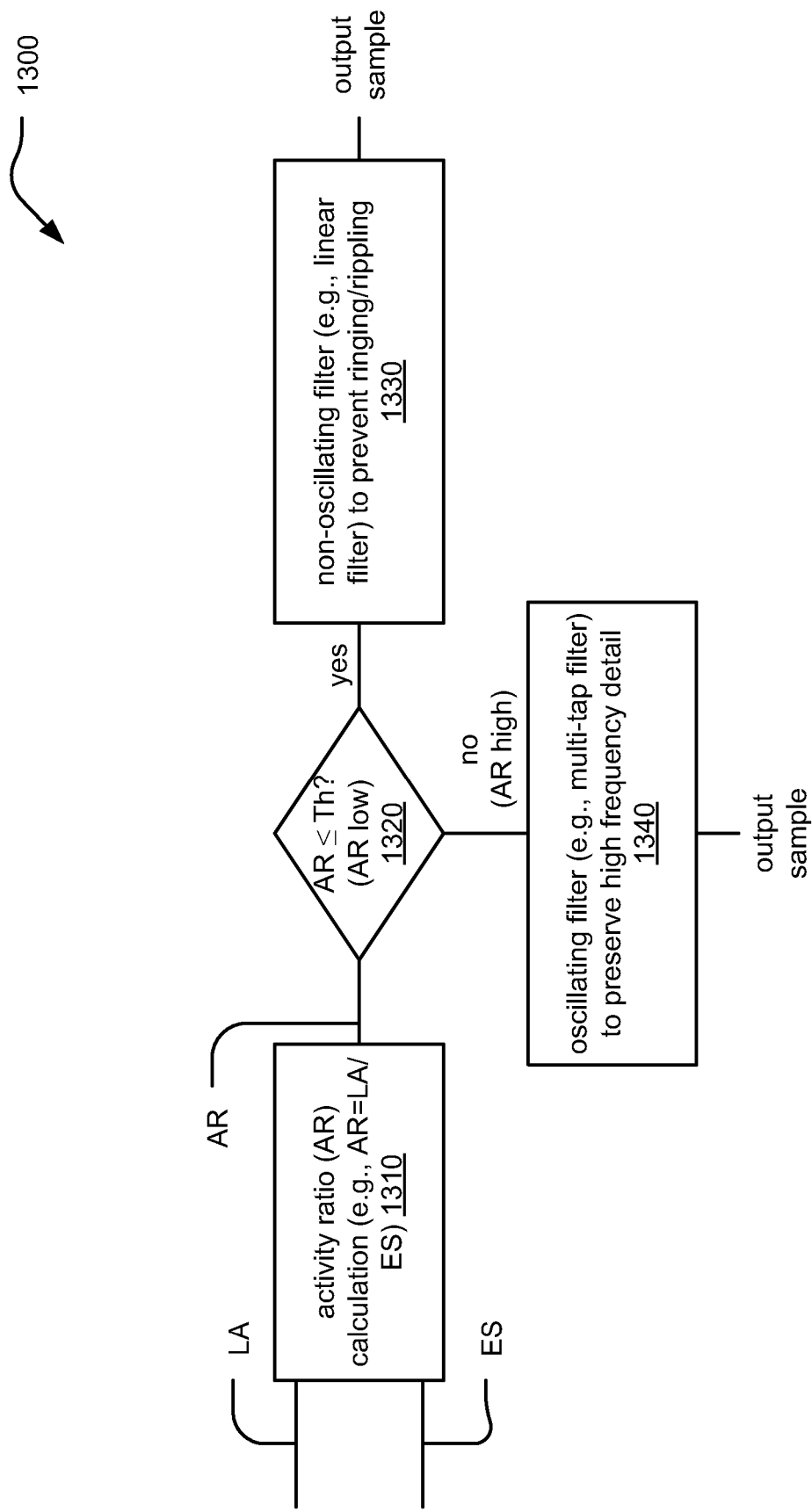
FIG. 13, FIG. 14, FIG. 15, and FIG. 16 illustrate various embodiment of selective image processing to generate an output sample using selective de-ringing image processing.

Referring to embodiment 1300 in FIG. 13, having computed the LA measure (e.g., local_activity) and the ES measure (e.g., edge_strength), the parameter of activity_ratio (AR) (e.g., activity_ratio), which may be calculated as shown in a block 1310 as follows:

activity_ratio=(local_activity/edge_strength); or
    AR=LA/ES.

Using the value of activity_ratio, the mechanism for computing the output value of the sample location is selected.

For a low activity_ratio value (e.g., less than or equal to some threshold, Th) as determined in a decision block 1320, the non-oscillating filter is needed to prevent ringing/rippling.

Alternatively, for a high activity_ratio, the oscillating filter output is used to preserve high-frequency detail, as shown in a block 1340.

However, it is noted that this leaves a middle ground in which choosing one filter module over the other filter module is not necessarily straightforward. In this middle ground, ringing can cause mild artifacts; however, by applying a non-oscillating filter, the image processing runs the risk of corrupting high-frequency detail and content within the digital image.

Figure 14:
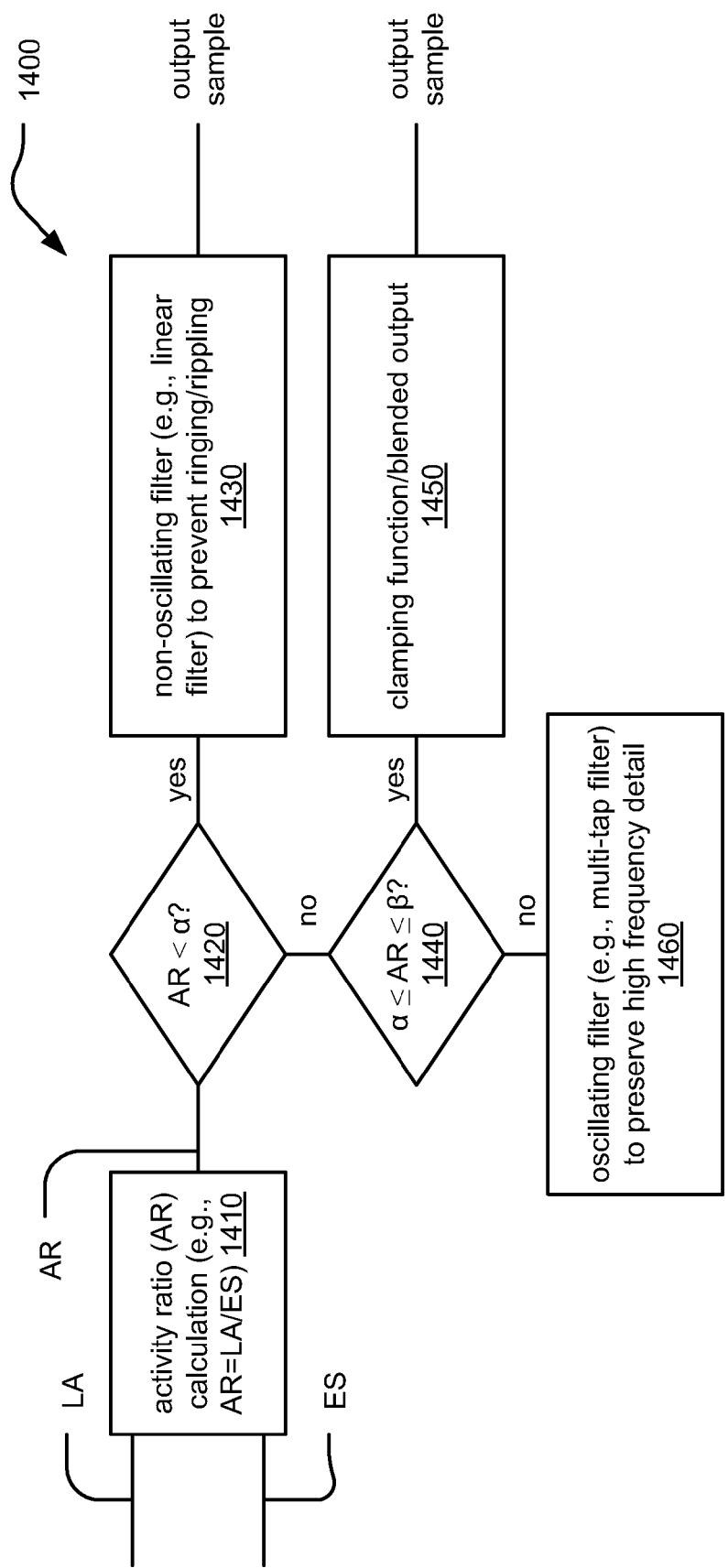

Referring to embodiment 1400 in FIG. 14, a clamping function/blended output may be alternatively employed instead to deal with this middle ground.

With respect to this "soft/progressive" clamping function, it is appropriate to mention noise resilience. If a hard threshold (e.g., "Th") is employed, and the image processing simply switches filters around that threshold, then the presence of noise may cause the image processing to toggle between the different output modes along or around a given edge. This will most likely degrade the image quality. The use of the "soft/progressive" clamping function addresses this situation.

In such a configuration, the ringing that may be introduced by the oscillating filter, in the presence of an edge, can be expected to be hidden by local sample to sample variations measured by local_activity when the AR value is large. However, in the middle ground, the output of the oscillating filter is kept clamped around the value provided by the non-oscillating filter, at least to an extent, in order to keep the ringing amplitude within the background local_activity.

The value AR (e.g., activity_ratio) may then used to compute the output sample value for the desired location using the computer executable code as follows:

```
activity_ratio = (local_activity / edge_strength);
if (activity_ratio < alpha)
        output sample = non oscillating filter output;
if (alpha <= activity_ratio <= beta)
        output sample = blended output;
if (activity_ratio > beta)
        output sample = oscillating filter output.
```

For example, the LA and ES measures are shown as being provided to a block 1410, in which the value AR is calculated there from. Then, the predetermined or fixed values of alpha and beta (e.g., $\alpha$ and $\beta$) are employed to determine where the value of AR lies relatively to alpha and beta (e.g., $\alpha$ and $\beta$), as shown in the decision blocks 1420 and 1440. These predetermined or fixed values of alpha and beta (e.g., $\alpha$ and $\beta$) can be experimentally optimized by a designer as desired for a given application. In one embodiment, the clamping function is designed with appropriately chosen alpha and beta (e.g., $\alpha$ and $\beta$) values so as to avoid visible decision jitter due to noise as mentioned above.

As shown in the decision block 1420, if the value of AR is less than alpha (e.g., $\alpha$), then the output value for the sample location is the output from the non-oscillating filter (e.g., a linear filter) to prevent ringing/rippling, as shown in a block 1430.

As shown in the decision block 1440, if the value of AR is greater than or equal to alpha (e.g., $\alpha$) and less than or equal to beta (e.g., $\beta$), then the output value for the sample location is the output from the clamping function/blended output, as shown in a block 1450.

Alternatively, if the value of AR is greater than beta (e.g., $\beta$), then the output value for the sample location is the output from the oscillating filter (e.g., a multi-tap filter) to preserve the high frequency content and detail within the image, as shown in a block 1460.

Figure 15:
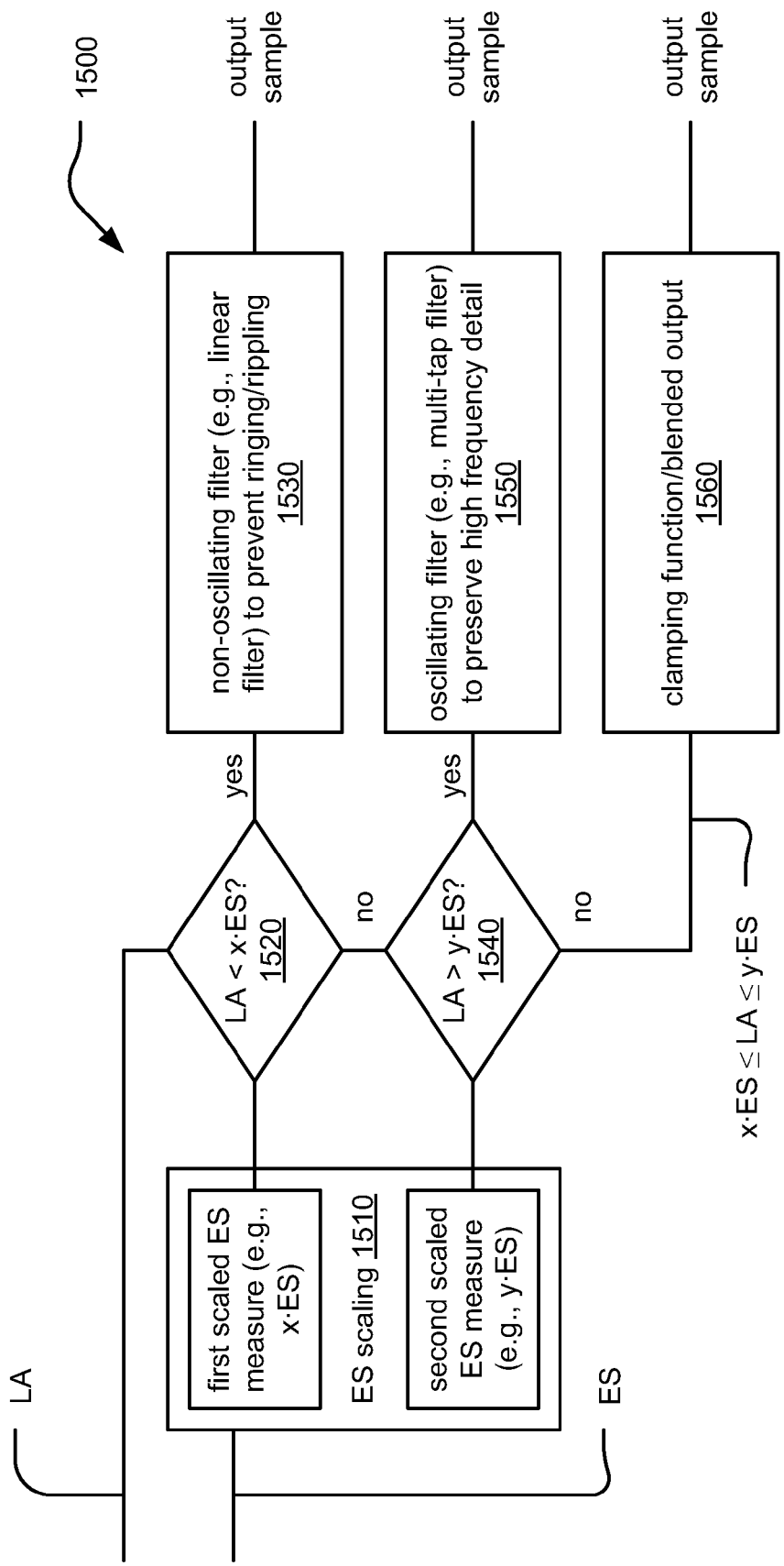

Referring to embodiment 1500 in FIG. 15, a block 1510 receives the ES measure and scales it accordingly to generate a first scaled ES measure (e.g., x·ES) and a second scaled ES measure (e.g., y·ES). These scaling values may be user selected for any particular application (e.g., x=1/16 and y=1/4 in one possible embodiment). If desired, the scaling factors may be integral multiples of each other. Generally speaking, the second scaled ES measure (e.g., y·ES) may simply be different (e.g., larger) than the first scaled ES measure (e.g., x·ES).

Thereafter, when the LA measure is less than the first scaled ES measure, as determined in a decision block 1520, then one or more processing modules process first selected pixels around an output sample location thereby generating an output value for the sample location using a non-oscillating filter (e.g., a linear filter) to prevent ringing/rippling, as shown in a block 1530. It is noted that a linear filter may be employed for up-scaling and light down-scaling, and a triangular filter may be employed for a heavier down-scaling in certain embodiments.

However, when the LA measure is greater than the second scaled ES measure, as determined in a decision block 1540, then one or more processing modules process second selected pixels around the output sample location thereby generating an output value for the sample location using an oscillating filter (e.g., a multi-tap filter) to preserve the high frequency content and detail within the image, as shown in a block 1550.

However, when the LA measure is greater than or equal to the first scaled ES measure and less than or equal to the second scaled ES measure, then one or more processing modules process third selected pixels around the output sample location thereby generating an output value for the sample location using a clamping function/blended output, as shown in a block 1560. These third selected pixels around the output sample location may be viewed as including some overlap with the first selected pixels and the second selected pixels. Alternatively, the output sample location as generated by block 1560 may be viewed as being generated using the outputs of the non-oscillating filter block 1530 and the oscillating filter block 1550.

Figure 16:
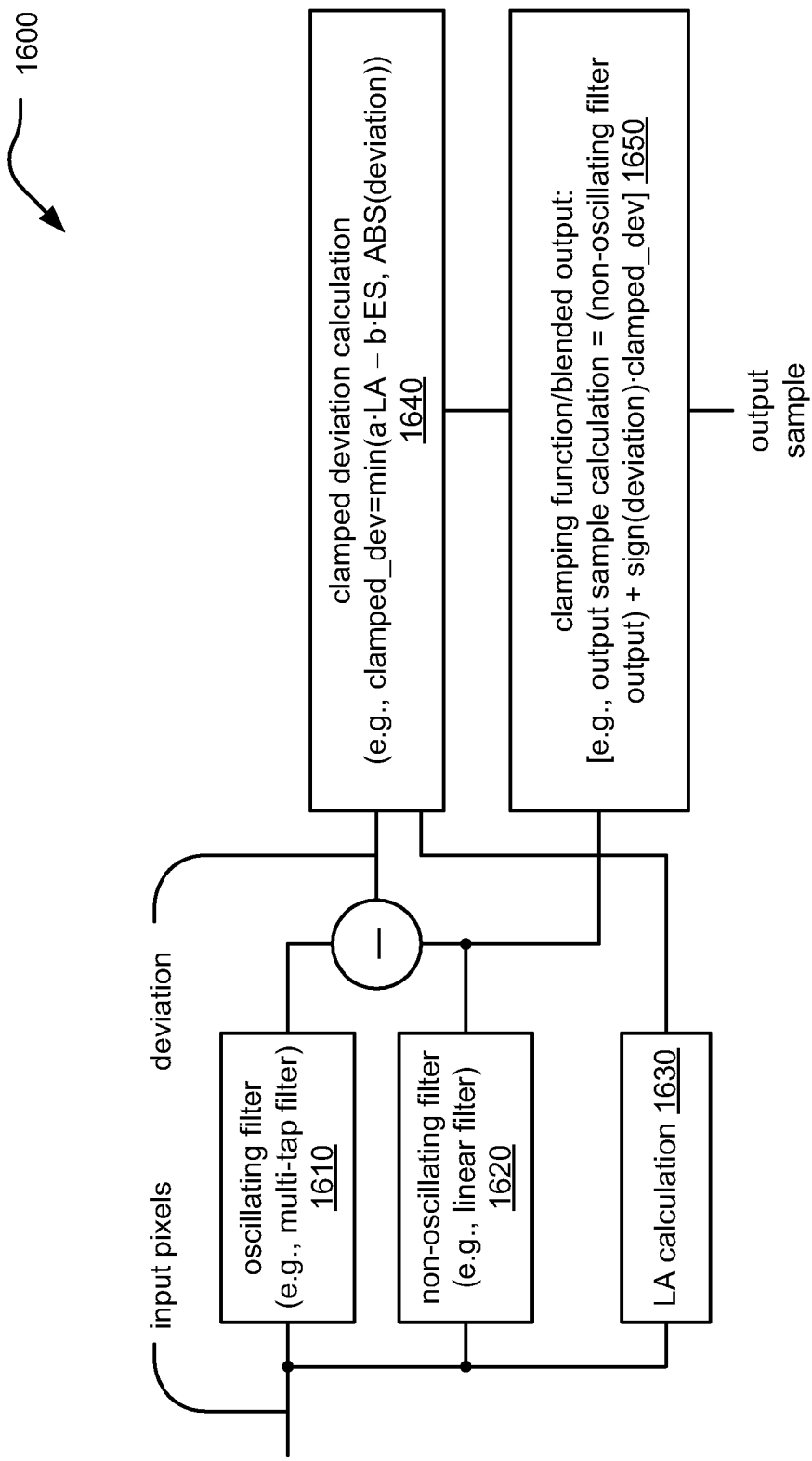

Referring to embodiment 1600 in FIG. 16, this diagram shows one means by which the blended output may be calculated. Input pixels around at least one vicinity of a desired output sample location are processed using an oscillating filter (e.g., a multi-tap filter), as shown in a block 1610, and also using a non-oscillating filter (e.g., a linear filter), as shown in a block 1620. Moreover, the LA measure is calculated, as shown in a block 1630.

In this embodiment, by employing the clamping function as described herein, the blended output may be computed as follows:

deviation=(oscillating filter output)−(non oscillating filter output) as shown by subtracting the outputs from the block 1610 and the block 1620;

clamped_dev=min(a*local_activity−b*edge_strength, abs(deviation)) as shown in a block 1640 wherein abs(deviation) is limited within a particular range;

output sample=(non oscillating filter output)+sign(deviation)*clamped_dev, as shown in a block 1650.

The values of "a" and "b" (i.e., coefficients of "local_activity" and "edge_strength") may be selected as desired in various applications. For example, if the edge_strength value increases for a given local_activity, then the deviation is further clamped. Similarly, if the local_activity decreases for a given edge_strength, then the deviation is also further clamped.

In this manner, the output value of the sample location is clamped (e.g., using a clamping function) such that it cannot deviate from the non oscillating filter output by more than a *local_activity, where the value (e.g., a) is again a fixed value that can be optimized by a designer as desired for the application. This also effectuates keeping the ringing oscillations "hidden" in the background local_activity. This manner of blending has been experimentally shown to limit ringing artifacts in the output without corrupting the fundamental high-frequency detail within the region. Blending can be performed with other techniques, but this was chosen for both its output quality and computational simplicity.

It is noted that the LA and ES measures (e.g., local_activity and edge_strength) may be susceptible to noise. The computation of the output value for the sample location as based on activity_ratio (AR), as described above, is one possible embodiment by which a soft threshold may be employed to that makes the de-ringing operation for image processing as described herein even more robust against the deleterious effects of noise.

Figure 17:
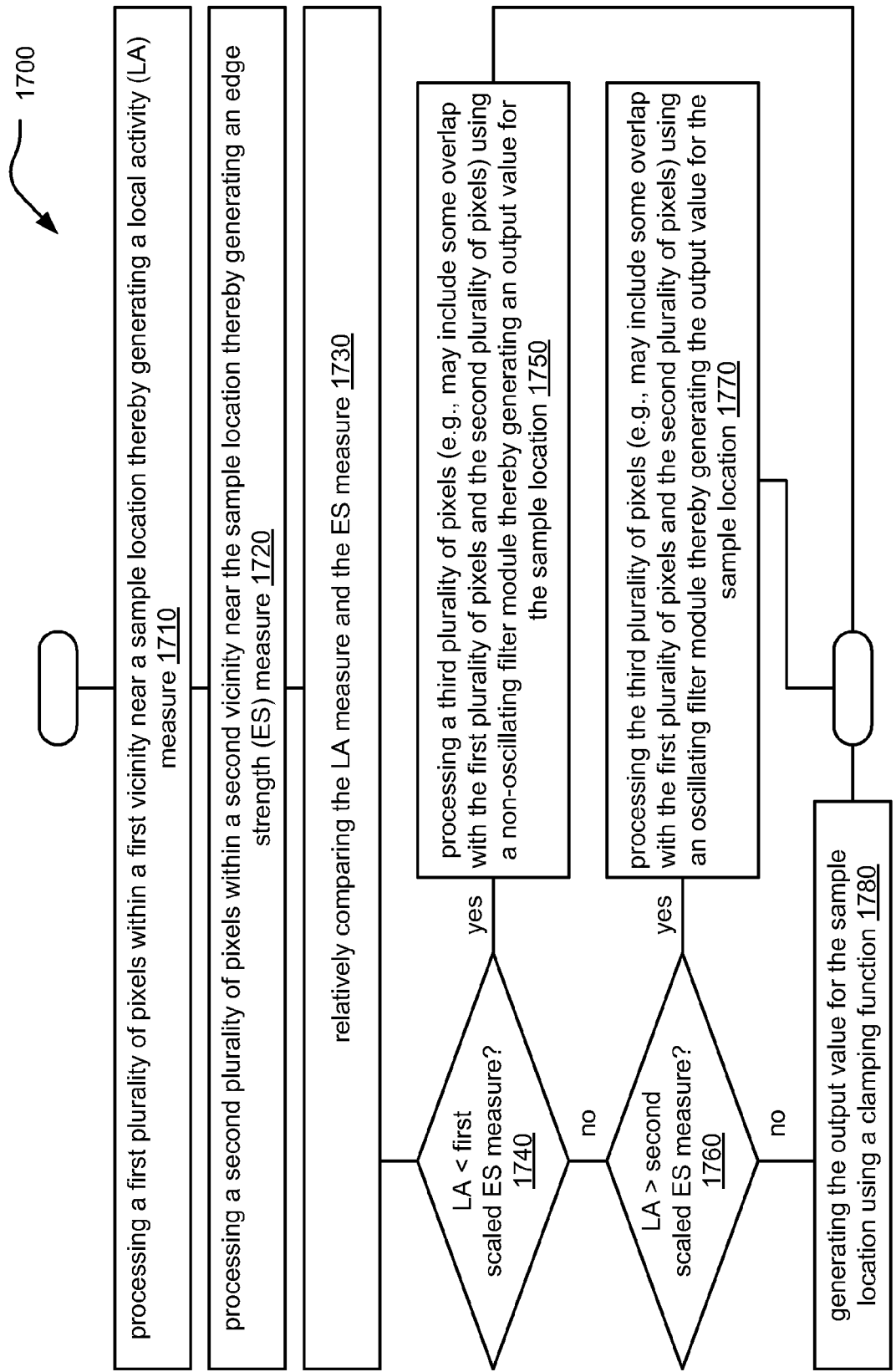
FIG. 17 illustrates an embodiment of a method for image processing to generate an output sample.

FIG. 17 illustrates an embodiment of a method 1700 for image processing to generate an output sample. The method 1700 operates by processing a first plurality of pixels within a first vicinity near a sample location thereby generating a local activity (LA) measure, as shown in a block 1710. Then, the method 1700 operates by processing a second plurality of pixels within a second vicinity near the sample location thereby generating an edge strength (ES) measure, as shown in a block 1720.

The method continues by relatively comparing the LA measure and the ES measure, as shown in a block 1730. In accordance with this relative comparison of the LA measure and the ES measure, scaled versions of the ES measure may be employed (e.g., by employing a first scaled ES measure and a second first scaled ES measure). The scaling factors of these two values may be designer selected (e.g., such that the first scaled ES measure is $\frac{1}{16}$-th of the ES measure, and the second scaled ES measure is $\frac{1}{4}$-th of the ES measure). Clearly, any other designer-selected or adaptively determined scaling values may alternatively be employed.

When the LA measure is less than a first scaled ES measure (in decision block 1740), the method 1700 operates by processing a third plurality of pixels (e.g., this third plurality of pixels may include some overlap with the first plurality of pixels and the second plurality of pixels) using a non-oscillating filter module thereby generating an output value for the sample location, as shown in a block 1750;

When the LA measure is greater than a second scaled ES measure (in decision block 1760), the method 1700 operates by processing the third plurality of pixels (e.g., again, this third plurality of pixels may include some overlap with the first plurality of pixels and the second plurality of pixels) using an oscillating filter module thereby generating the output value for the sample location, as shown in a block 1770; and However, when the LA measure is greater than or equal to the first scaled ES measure and less than or equal to the second scaled ES measure, the method 1700 operates by generating the output value for the sample location using a clamping function that is based, at least in part, on the relative comparison of the LA measure and the ES measure, as shown in a block 1780.

It is noted that the first vicinity near the sample location may by relatively smaller than the second vicinity near the sample location. Also, the first plurality of pixels may include fewer pixels than the second plurality of pixels.

The method 1700 can be performed within any apparatus or device that performs image processing including any such device as described with reference to FIGS. 1A-1H.

It is noted that the de-ringing operation for image processing as presented herein may be implemented anywhere image processing and/or filtering takes place. Some examples include, but are not limited to video scaling (up & down, horizontal and vertical), graphic scaling (up & down, horizontal and vertical), chroma re-sampling, analog video encoding (which may include appropriate digital sampling performed and reconversion to analog), and/or analog video decoding (which may include appropriate digital sampling performed and reconversion to analog).

It is noted that any of the various modules (e.g., processing modules, various calculation modules, comparison modules, various filter modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A method for operating an image processing device, comprising:
    processing a first plurality of pixels within a first vicinity near a sample location thereby generating a local activity (LA) measure;
    processing a second plurality of pixels within a second vicinity, such that at least one portion thereof being distinct from the first vicinity, near the sample location thereby generating an edge strength (ES) measure; and
    comparing the LA measure and the ES measure relatively and, based on the relative comparison of the LA measure and the ES measure, selectively processing a third plurality of pixels near the sample location thereby generating an output value for the sample location.

2. The method of claim 1, further comprising:
    when the LA measure being less than a first scaled ES measure, employing a first filter module for processing the third plurality of pixels thereby generating an output value for the sample location;
    when the LA measure being greater than a second scaled ES measure, employing a second filter module for processing the third plurality of pixels thereby generating the output value for the sample location; and
    when the LA measure being greater than or equal to the first scaled ES measure and less than or equal to the second scaled ES measure, generating the output value for the sample location using a clamping function being based, at least in part, on the relative comparison of the LA measure and the ES measure.

3. The method of claim 2, wherein:
    the first filter module including a linear filter module and a triangular filter module such that:
        the linear filter module being employed for up-scaling and first down-scaling; and
        the triangular filter module being employed for second down-scaling being relatively heavier than the first down-scaling; and
    the second filter module being a multi-tap filter module.

4. The method of claim 2, wherein:
    the first scaled ES measure being $1/16$-th of the ES measure; and
    the second scaled ES measure being $1/4$-th of the ES measure.

5. The method of claim 2, wherein:
    the second scaled ES measure being an integral multiple of the first scaled ES measure.

6. The method of claim 1, further comprising:
    successively generating a plurality of output values for a plurality of sample locations of a digital image.

7. The method of claim 1, wherein:
    the first vicinity near the sample location being relatively smaller than the second vicinity near the sample location; and
    the first plurality of pixels including fewer pixels than the second plurality of pixels.

8. The method of claim 1, wherein:
    the image processing device being a set top box (STB) or a digital video disc (DVD) player.

9. A method for operating an image processing device, comprising:
    processing a first plurality of pixels within a first vicinity near a sample location thereby generating a local activity (LA)measure;
    processing a second plurality of pixels within a second vicinity near the sample location thereby generating an edge strength (ES) measure;
    relatively comparing the LA measure and the ES measure;
    when the LA measure being less than a first scaled ES measure, processing a third plurality of pixels near the sample location using a non-oscillating filter module thereby generating an output value for the sample location;
    when the LA measure being greater than a second scaled ES measure, processing the third plurality of pixels using an oscillating filter module thereby generating the output value for the sample location; and
    when the LA measure being greater than or equal to the first scaled Es measure and less than or equal to the second scaled ES measure, generating the output value for the sample location using a clamping function being based, at least in part, on the relative comparison of the LA measure and the ES measure; and wherein:

the first vicinity near the sample location being relatively smaller than the second vicinity near the sample location; and the first plurality of pixels including fewer pixels than the second plurality of pixels.

10. The method of claim 9, wherein:

the first scaled ES measure being 1/16-th of the ES measure; and the second scaled ES measure being 1/4-th of the ES measure.

11. The method of claim 9, wherein:

the image processing device being a set top box (STB) or a digital video disc (DVD) player.

12. An apparatus, comprising:

an input for receiving a first plurality of pixels; and at least one processing module for:

processing the first plurality of pixels within a first vicinity near a sample location thereby generating a local activity (LA) measure;

processing a second plurality of pixels within a second vicinity, such that at least one portion thereof being distinct from the first vicinity, near the sample location thereby generating an edge strength (ES) measure; and comparing the LA measure and the ES measure relatively and, based on the relative comparison of the LA measure and the ES measure, selectively performs or selectively directs processing of a third plurality of pixels near the sample location thereby generating an output value for the sample location.

13. The apparatus of claim 12, further comprising:

a first filter module;

a second filter module; and wherein:

when the LA measure being less than a first scaled ES measure, the first filter module processing the third plurality of pixels thereby generating an output value for the sample location;

when the LA measure being greater than a second scaled ES measure, the second filter module processing the third plurality of pixels thereby generating the output value for the sample location; and when the LA measure being greater than or equal to the first scaled ES measure and less than or equal to the second scaled ES measure, the at least one processing module generating the output value for the sample location using a clamping function being based, at least in part, on the relative comparison of the LA measure and the ES measure.

14. The apparatus of claim 13, wherein:

the first filter module including a linear filter module and a triangular filter module such that:

the linear filter module for performing up-scaling and first down-scaling; and the triangular filter module for performing second down-scaling being relatively heavier than the first down-scaling; and the second filter module being a multi-tap filter module.

15. The apparatus of claim 13, wherein:

the first scaled ES measure being 1/16-th of the ES measure; and the second scaled ES measure being 1/4-th of the ES measure.

16. The apparatus of claim 13, wherein:

the second scaled ES measure being an integral multiple of the first scaled ES measure.

17. The apparatus of claim 12, wherein:

the apparatus successively generating a plurality of output values for a plurality of sample locations of a digital image.

18. The apparatus of claim 12, wherein:

the first vicinity near the sample location being relatively smaller than the second vicinity near the sample location; and the first plurality of pixels includes fewer pixels than the second plurality Of pixels.

19. The apparatus of claim 12, wherein:

the apparatus being an integrated circuit.

20. The apparatus of claim 12, wherein:

the apparatus being a set top box (STB) or a digital video disc (DVD) player 1.

* * * * *

UNITED STATES PATENT AND TRADEMARK OFFICE
CERTIFICATE OF CORRECTION

PATENT NO.       : 8,300,948 B2
APPLICATION NO.  : 12/400596
DATED            : October 30, 2012
INVENTOR(S)      : Zhang et al.

It is certified that error appears in the above-identified patent and that said Letters Patent is hereby corrected as shown below:

In the Claims:

Col. 16, line 65, in claim 9: replace "scaled Es" with --scaled ES--
Col. 18, line 36, in claim 18: replace "Of pixels" with --of pixels--
Col. 18, line 41, in claim 20: after "player" delete "1"

Signed and Sealed this
First Day of October, 2013

Teresa Stanek Rea
*Deputy Director of the United States Patent and Trademark Office*